US011032244B2

(12) United States Patent
Dahlberg

(10) Patent No.: US 11,032,244 B2
(45) Date of Patent: Jun. 8, 2021

(54) SYSTEMS AND METHODS FOR DETERMINING ASSET IMPORTANCE IN SECURITY RISK MANAGEMENT

(71) Applicant: BitSight Technologies, Inc., Boston, MA (US)

(72) Inventor: Daniel Dahlberg, Somerville, MA (US)

(73) Assignee: BitSight Technologies, Inc., Boston, MA (US)

( * ) Notice: Subject to any disclaimer, the term of this patent is extended or adjusted under 35 U.S.C. 154(b) by 0 days.

(21) Appl. No.: 17/039,675

(22) Filed: Sep. 30, 2020

(65) Prior Publication Data

US 2021/0099428 A1    Apr. 1, 2021

Related U.S. Application Data

(60) Provisional application No. 62/908,565, filed on Sep. 30, 2019.

(51) Int. Cl.
*H04L 29/06* (2006.01)
*H04L 29/12* (2006.01)
*G06F 16/951* (2019.01)

(52) U.S. Cl.
CPC ........ *H04L 63/0236* (2013.01); *G06F 16/951* (2019.01); *H04L 61/1511* (2013.01); *H04L 61/2007* (2013.01); *H04L 63/0823* (2013.01); *H04L 63/145* (2013.01)

(58) Field of Classification Search
CPC ............. H04L 63/0236; H04L 61/1511; H04L 61/2007; H04L 63/0823; H04L 63/145; G06F 16/951
See application file for complete search history.

(56) References Cited

U.S. PATENT DOCUMENTS

| 5,867,799 A | 2/1999 | Lang et al. |
| 6,016,475 A | 1/2000 | Miller et al. |
| 6,792,401 B1 | 9/2004 | Nigro et al. |
| 7,062,572 B1 | 6/2006 | Hampton |

(Continued)

FOREIGN PATENT DOCUMENTS

| CA | 3015146 A1 | 8/2017 |
| WO | WO-2017/142694 A1 | 8/2017 |
| WO | WO-2019/023045 A1 | 1/2019 |

OTHER PUBLICATIONS

U.S. Appl. No. 15/271,655 Published as: US2018/0083999, Self-Published Security Risk Management, filed Sep. 21, 2016.

(Continued)

*Primary Examiner* — Arvin Eskandarnia
(74) *Attorney, Agent, or Firm* — Goodwin Procter LLP

(57) ABSTRACT

Disclosed are computer-implemented methods for ranking importance of assets of an entity, in which the assets can include hosts and/or IP addresses associated with the entity. The exemplary methods can include receiving datasets from one or more sources indicating frequency of system access, system configuration, and/or application configuration. The methods can include determining one or more input data based on the datasets. The methods can include determining, for each host and/or IP address associated with the entity, an importance ranking based on the input data. In some examples, the importance ranking may be based on a weighting of two or more input data.

23 Claims, 6 Drawing Sheets

(56) References Cited

U.S. PATENT DOCUMENTS

| | | |
|---|---|---|
| D525,264 S | 7/2006 | Chotai |
| D525,629 S | 7/2006 | Chotai |
| 7,100,195 B1 | 8/2006 | Underwood |
| 7,194,769 B2 | 3/2007 | Lippmann et al. |
| 7,290,275 B2 | 10/2007 | Baudoin et al. |
| D604,740 S | 11/2009 | Matheny |
| 7,650,570 B2 | 1/2010 | Torrens |
| 7,747,778 B1 | 6/2010 | King |
| 7,748,038 B2 | 6/2010 | Olivier et al. |
| 7,827,607 B2 | 11/2010 | Sobel et al. |
| D630,645 S | 1/2011 | Tokunaga |
| 7,971,252 B2 | 6/2011 | Lippmann et al. |
| D652,048 S | 1/2012 | Joseph |
| D667,022 S | 9/2012 | LoBosco |
| 8,370,933 B1 | 2/2013 | Buckler |
| 8,429,630 B2 | 4/2013 | Nickolov et al. |
| D682,287 S | 5/2013 | Cong |
| D688,260 S | 8/2013 | Pearcy |
| 8,504,556 B1 | 8/2013 | Rice et al. |
| D691,164 S | 10/2013 | Lim |
| D694,252 S | 11/2013 | Helm |
| D694,253 S | 11/2013 | Helm |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,775,402 B2 | 7/2014 | Bakerville et al. |
| 8,825,662 B1 | 9/2014 | Kingman et al. |
| D730,918 S | 6/2015 | Park |
| 9,053,210 B2 | 6/2015 | Elnikety |
| 9,075,990 B1 | 7/2015 | Yang |
| D740,847 S | 10/2015 | Yampolskiy et al. |
| D740,848 S | 10/2015 | Bolts |
| D741,351 S | 10/2015 | Kito |
| D746,832 S | 1/2016 | Pearcy |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park |
| D754,696 S | 4/2016 | Follett |
| D756,371 S | 5/2016 | Bertnick |
| D756,372 S | 5/2016 | Bertnick |
| D756,392 S | 5/2016 | Yun |
| D759,084 S | 6/2016 | Yampolskiy et al. |
| D759,689 S | 6/2016 | Olson |
| 9,372,994 B1 | 6/2016 | Yampolskiy et al. |
| 9,373,144 B1 | 6/2016 | Ng et al. |
| D760,782 S | 7/2016 | Kendler |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,424,333 B1 | 8/2016 | Bisignani |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo |
| D775,635 S | 1/2017 | Raji |
| D776,136 S | 1/2017 | Chen |
| D776,153 S | 1/2017 | Yampolskiy et al. |
| D777,177 S | 1/2017 | Chen |
| 9,560,072 B1 | 1/2017 | Xu |
| D778,927 S | 2/2017 | Bertnick |
| D778,928 S | 2/2017 | Bertnick |
| D779,512 S | 2/2017 | Kimura |
| D779,514 S | 2/2017 | Baris |
| D779,531 S | 2/2017 | List |
| D780,770 S | 3/2017 | Sum |
| D785,009 S | 4/2017 | Lim |
| D785,010 S | 4/2017 | Bachman |
| D785,016 S | 4/2017 | Berwick |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne |
| D789,947 S | 6/2017 | Sun |
| D789,957 S | 6/2017 | Wu |
| D791,153 S | 7/2017 | Rice |
| D791,834 S | 7/2017 | Eze |
| D792,427 S | 7/2017 | Weaver |
| D795,891 S | 8/2017 | Kohan |
| D796,523 S | 9/2017 | Bhandari |
| D801,989 S | 11/2017 | Iketsuki |
| D803,237 S | 11/2017 | Wu |
| D804,528 S | 12/2017 | Martin |
| D806,735 S | 1/2018 | Olsen |
| D806,737 S | 1/2018 | Chung |
| D809,523 S | 2/2018 | Lipka |
| D812,633 S | 3/2018 | Saneii |
| D814,483 S | 4/2018 | Gavaskar |
| D815,119 S | 4/2018 | Chalker |
| D815,148 S | 4/2018 | Martin |
| D816,105 S | 4/2018 | Rudick |
| D816,116 S | 4/2018 | Selassie |
| 9,954,893 B1 | 4/2018 | Zhao et al. |
| D817,970 S | 5/2018 | Chang |
| D817,977 S | 5/2018 | Kato |
| D819,687 S | 6/2018 | Yampolskiy et al. |
| 10,044,750 B2 | 8/2018 | Livshits et al. |
| 10,079,854 B1 | 9/2018 | Scott et al. |
| 10,142,364 B2 | 11/2018 | Baukes et al. |
| 10,180,966 B1 | 1/2019 | Lang et al. |
| 10,185,924 B1 | 1/2019 | McClintock et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| 10,257,219 B1 | 4/2019 | Geil et al. |
| 10,305,854 B2 | 5/2019 | Alizadeh-Shabdiz et al. |
| 10,331,502 B1 | 6/2019 | Hart |
| 10,339,321 B2 | 7/2019 | Tedeschi |
| 10,339,484 B2 | 7/2019 | Pai et al. |
| 10,348,755 B1 | 7/2019 | Shavell et al. |
| 10,412,083 B2 | 9/2019 | Zou et al. |
| 10,469,515 B2 | 11/2019 | Helmsen et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| 10,540,374 B2 | 1/2020 | Singh et al. |
| D880,512 S | 4/2020 | Greenwald et al. |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0050862 A1 | 3/2003 | Bleicken et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0098375 A1 | 5/2004 | DeCarlo |
| 2004/0133561 A1 | 7/2004 | Burke |
| 2004/0133689 A1 | 7/2004 | Vasisht |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0066195 A1 | 3/2005 | Jones |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0234767 A1 | 10/2005 | Bolzman et al. |
| 2005/0278726 A1 | 12/2005 | Cano |
| 2006/0036335 A1 | 2/2006 | Banter |
| 2006/0107226 A1 | 5/2006 | Matthews |
| 2006/0173992 A1 | 8/2006 | Weber et al. |
| 2006/0212925 A1 | 9/2006 | Shull et al. |

(56) References Cited

U.S. PATENT DOCUMENTS

| | | |
|---|---|---|
| 2006/0253581 A1 | 11/2006 | Dixon et al. |
| 2007/0016948 A1 | 1/2007 | Dubrovsky et al. |
| 2007/0067845 A1 | 3/2007 | Wiemer et al. |
| 2007/0143851 A1 | 6/2007 | Nicodemus et al. |
| 2007/0179955 A1 | 8/2007 | Croft et al. |
| 2007/0198275 A1 | 8/2007 | Malden et al. |
| 2007/0214151 A1 | 9/2007 | Thomas et al. |
| 2007/0282730 A1 | 12/2007 | Carpenter et al. |
| 2008/0017526 A1 | 1/2008 | Prescott et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0140495 A1 | 6/2008 | Bhamidipaty et al. |
| 2008/0140728 A1 | 6/2008 | Fraser et al. |
| 2008/0162931 A1 | 7/2008 | Lord et al. |
| 2008/0172382 A1 | 7/2008 | Prettejohn |
| 2008/0175266 A1 | 7/2008 | Alperovitch et al. |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0262895 A1 | 10/2008 | Hofmeister et al. |
| 2009/0044272 A1 | 2/2009 | Jarrett |
| 2009/0094265 A1 | 4/2009 | Vlachos et al. |
| 2009/0125427 A1 | 5/2009 | Atwood et al. |
| 2009/0132861 A1 | 5/2009 | Costa et al. |
| 2009/0161629 A1 | 6/2009 | Purkayastha et al. |
| 2009/0193054 A1 | 7/2009 | Karimisetty et al. |
| 2009/0216700 A1 | 8/2009 | Bouchard et al. |
| 2009/0265787 A9 | 10/2009 | Baudoin et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0042605 A1 | 2/2010 | Cheng et al. |
| 2010/0057582 A1 | 3/2010 | Arfin |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2011/0137704 A1 | 6/2011 | Mitra |
| 2011/0145576 A1 | 6/2011 | Bettan |
| 2011/0185403 A1 | 7/2011 | Dolan et al. |
| 2011/0213742 A1 | 9/2011 | Lemmond et al. |
| 2011/0219455 A1 | 9/2011 | Bhagwan et al. |
| 2011/0231395 A1 | 9/2011 | Vadlamani |
| 2011/0239300 A1 | 9/2011 | Klein et al. |
| 2011/0296519 A1 | 12/2011 | Ide et al. |
| 2012/0036263 A1 | 2/2012 | Madden et al. |
| 2012/0059823 A1 | 3/2012 | Barber et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0198558 A1 | 8/2012 | Liu et al. |
| 2012/0215892 A1 | 8/2012 | Wanser |
| 2012/0255027 A1 | 10/2012 | Kanakapura et al. |
| 2012/0291129 A1 | 11/2012 | Shulman et al. |
| 2013/0014253 A1 | 1/2013 | Vivian et al. |
| 2013/0060351 A1 | 3/2013 | Imming et al. |
| 2013/0080505 A1 | 3/2013 | Nielsen et al. |
| 2013/0086521 A1 | 4/2013 | Grossele |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0173791 A1 | 7/2013 | Longo |
| 2013/0227078 A1 | 8/2013 | Wei et al. |
| 2013/0282406 A1 | 10/2013 | Snyder et al. |
| 2013/0291105 A1 | 10/2013 | Zheng |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1 | 12/2013 | Flores |
| 2014/0006129 A1 | 1/2014 | Heath |
| 2014/0019196 A1 | 1/2014 | Wiggins |
| 2014/0108474 A1 | 4/2014 | David et al. |
| 2014/0114755 A1 | 4/2014 | Mezzacca |
| 2014/0114843 A1 | 4/2014 | Klein et al. |
| 2014/0130158 A1 | 5/2014 | Wang et al. |
| 2014/0146370 A1 | 5/2014 | Banner et al. |
| 2014/0189098 A1 | 7/2014 | MaGill et al. |
| 2014/0204803 A1 | 7/2014 | Nguyen et al. |
| 2014/0237545 A1 | 8/2014 | Mylavarapu et al. |
| 2014/0244317 A1 | 8/2014 | Roberts et al. |
| 2014/0283068 A1 | 9/2014 | Call et al. |
| 2014/0288996 A1 | 9/2014 | Rence et al. |
| 2014/0304816 A1 | 10/2014 | Klein et al. |
| 2014/0334336 A1 | 11/2014 | Chen et al. |
| 2014/0337633 A1 | 11/2014 | Yang et al. |
| 2015/0033331 A1 | 1/2015 | Stern et al. |
| 2015/0033341 A1 | 1/2015 | Schmidtler et al. |
| 2015/0074579 A1 | 3/2015 | Gladstone et al. |
| 2015/0081860 A1 | 3/2015 | Kuehnel et al. |
| 2015/0156084 A1 | 6/2015 | Kaminsky et al. |
| 2015/0180883 A1 | 6/2015 | Aktas et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0347756 A1 | 12/2015 | Hidayat et al. |
| 2015/0350229 A1 | 12/2015 | Mitchell |
| 2015/0381649 A1 | 12/2015 | Schultz et al. |
| 2016/0036849 A1 | 2/2016 | Zakian |
| 2016/0065613 A1 | 3/2016 | Cho et al. |
| 2016/0119373 A1 | 4/2016 | Fausto et al. |
| 2016/0140466 A1 | 5/2016 | Sidebottom |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0248797 A1 | 8/2016 | Yampolskiy et al. |
| 2016/0253500 A1 | 9/2016 | Alme et al. |
| 2016/0259945 A1 | 9/2016 | Yampolskiy et al. |
| 2016/0337387 A1 | 11/2016 | Hu et al. |
| 2016/0344801 A1 | 11/2016 | Akkarawittayapoom |
| 2016/0364496 A1 | 12/2016 | Li |
| 2016/0373485 A1 | 12/2016 | Kamble |
| 2017/0048267 A1 | 2/2017 | Yampolskiy et al. |
| 2017/0063901 A1 | 3/2017 | Muddu et al. |
| 2017/0142148 A1 | 5/2017 | Bu er et al. |
| 2017/0161409 A1 | 6/2017 | Martin |
| 2017/0236078 A1 | 8/2017 | Rasumov |
| 2017/0237764 A1 | 8/2017 | Rasumov |
| 2017/0279843 A1 | 9/2017 | Schultz et al. |
| 2017/0300911 A1 | 10/2017 | Alnajem |
| 2017/0316324 A1 | 11/2017 | Barrett et al. |
| 2017/0318045 A1 | 11/2017 | Johns et al. |
| 2017/0324766 A1 | 11/2017 | Gonzalez |
| 2017/0337487 A1 | 11/2017 | Nock et al. |
| 2018/0013716 A1 | 1/2018 | Connell et al. |
| 2018/0103043 A1 | 4/2018 | Kupreev et al. |
| 2018/0123934 A1 | 5/2018 | Gissing et al. |
| 2018/0124110 A1 | 5/2018 | Hunt et al. |
| 2018/0139180 A1 | 5/2018 | Napchi et al. |
| 2018/0157468 A1 | 6/2018 | Stachura |
| 2018/0285414 A1 | 10/2018 | Kondiles et al. |
| 2018/0322584 A1 | 11/2018 | Crabtree et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0365519 A1 | 12/2018 | Pollard et al. |
| 2018/0375896 A1 | 12/2018 | Wang et al. |

(56) References Cited

U.S. PATENT DOCUMENTS

| | | |
|---|---|---|
| 2019/0034845 A1 | 1/2019 | Mo et al. |
| 2019/0065545 A1 | 2/2019 | Hazel et al. |
| 2019/0079869 A1 | 3/2019 | Baldi et al. |
| 2019/0089711 A1 | 3/2019 | Faulkner |
| 2019/0098025 A1 | 3/2019 | Lim |
| 2019/0124091 A1 | 4/2019 | Ujiie et al. |
| 2019/0140925 A1 | 5/2019 | Pon et al. |
| 2019/0141060 A1 | 5/2019 | Lim |
| 2019/0147378 A1 | 5/2019 | Mo et al. |
| 2019/0166152 A1 | 5/2019 | Steele et al. |
| 2019/0215331 A1 | 7/2019 | Anakata et al. |
| 2019/0303574 A1 | 10/2019 | Lamay et al. |
| 2019/0379632 A1 | 12/2019 | Dahlberg et al. |
| 2019/0392252 A1 | 12/2019 | Fighel et al. |
| 2020/0053127 A1 | 2/2020 | Brotherton et al. |
| 2020/0074084 A1 | 3/2020 | Dorrans et al. |
| 2020/0097845 A1* | 3/2020 | Shaikh ................. G06K 9/6267 |
| 2020/0356689 A1* | 11/2020 | McEnroe ............. H04L 63/126 |

OTHER PUBLICATIONS

U.S. Appl. No. 15/377,574 U.S. Pat. No. 9,705,932, Methods and Systems for Creating, De-Duplicating, and Accessing Data Using an Object Storage System, filed Dec. 13, 2016.
U.S. Appl. No. 14/021,585 U.S. Pat. No. 9,438,615 Published as: US2015/0074579, Security Risk Management, filed Sep. 9, 2013.
U.S. Appl. No. 15/216,955 Published as: US2016/0330231, Methods for Using Organizational Behavior for Risk Ratings, filed Jul. 22, 2016.
U.S. Appl. No. 15/239,063 Published as: US2017/0093901, Security Risk Management, filed Aug. 17, 2016.
U.S. Appl. No. 16/405,121 Published as: US2019/0260791, Methods for Using Organizational Behavior for Risk Ratings, filed May 7, 2019.
U.S. Appl. No. 17/025,930, Methods for Using Organizational Behavior for Risk Ratings, filed Sep. 18, 2020.
U.S. Appl. No. 13/240,572 Published as: US2016/0205126, Information Technology Security Assessment System, filed Sep. 22, 2011.
U.S. Appl. No. 14/944,484 U.S. Pat. No. 9,973,524 Published as: US2016/0323308, Information Technology Security Assessment System, filed Nov. 18, 2015.
U.S. Appl. No. 15/142,677 U.S. Pat. No. 9,830,569 Published as: US/2016/0239772, Security Assessment Using Service Provider Digital Asset Information, filed Apr. 29, 2016.
U.S. Appl. No. 17/069,151, Information Technology Security Assessment System, filed Oct. 13, 2020.
U.S. Appl. No. 15/134,845 U.S. Pat. No. 9,680,858, Annotation Platform for a Security Risk System, filed Apr. 21, 2016.
U.S. Appl. No. 15/044,952 Published as: US2017/0236077, Relationships Among Technology Assets and Services and the Entities Responsible for Them, filed Feb. 16, 2016.
U.S. Appl. No. 15/089,375 U.S. Pat. No. 10,176,445 Published as: US2017/0236079, Relationships Among Technology Assets and Services and The Entities Responsible for Them, filed Apr. 1, 2016.
U.S. Appl. No. 29/598,298 U.S. Pat. No. D835,631, Computer Displat Screen with Graphical User Interface, filed Mar. 24, 2017.
U.S. Appl. No. 29/598,299 U.S. Pat. No. D818,475, Computer Display with Security Ratings Graphical User Inferface, filed Mar. 24, 2017.
U.S. Appl. No. 29/599,622, Computer Display with Security Ratings Graphical User Interface, filed Apr. 5, 2017.
U.S. Appl. No. 29/599,620, Computer Display with Security Ratings Graphical User Interface, filed Apr. 5, 2017.
U.S. Appl. No. 16/015,686, Methods For Mapping IP Addresses and Domains to Organizations Using User Activity Data, filed Jun. 22, 2018.
U.S. Appl. No. 16/543,075, Methods for Mapping IP Addresses and Domains to Organizations Using User Activity Data, filed Aug. 16, 2019.
U.S. Appl. No. 16/738,825, Methods for Mapping IP Addresses and Domains to Organizations Using User Activity Data, filed Jan. 9, 2020.
U.S. Appl. No. 15/918,286, Correlated Risk in Cybersecurity, filed Mar. 12, 2018.
U.S. Appl. No. 16/292,953, Correlated Risk in Cybersecurity, filed May 5, 2019.
U.S. Appl. No. 16/795,056, Correlated Risk in Cybersecurity, filed Feb. 19, 2020.
U.S. Appl. No. 16/170,680, Systems and Methods for Remote Detection of Software Through Browser Webinjects, filed Oct. 25, 2018.
U.S. Appl. No. 16/688,647, Systems and Methods for Remote Detection of Software Through Browser Webinjects, filed Nov. 19, 2019.
U.S. Appl. No. 17/000,135, Systems and Methods for Remote Detection of Software Through Browser Webinjects, filed Aug. 21, 2020.
U.S. Appl. No. 15/954,921, Systems and Methods for External Detection of Misconfigured Systems, filed Apr. 17, 2018.
U.S. Appl. No. 17/014,495, Systems and Methods for External Detection of Misconfigured Systems, filed Sep. 8, 2020.
U.S. Appl. No. 16/549,764, Systems and Methods for Inferring Entity Relationships Via Network Communications of Users or User Devices, filed Aug. 23, 2019.
U.S. Appl. No. 16/787,650, Systems and Methods for Inferring Entity Relationships Via Network Communications of Users or User Devices, filed Feb. 11, 2020.
U.S. Appl. No. 16/583,991, Systems and Methods For Network Asset Discovery and Association Thereof with Entities, filed Sep. 26, 2019.
U.S. Appl. No. 17/085,550, Systems and Methods for Network Asset Discovery and Association Thereof with Entities, filed Oct. 30, 2020.
U.S. Appl. No. 29/666,942, Computer Display With Graphical User Interface, filed Oct. 17, 2018.
U.S. Appl. No. 16/360,641, Systems and Methods for Forecasting Cybersecurity Ratings Based on Event-Rate Scenarios, filed Mar. 21, 2019.
U.S. Appl. No. 16/514,771, Systems and Methods for Generating Security Improvement Plans for Entities, filed Jul. 17, 2019.
U.S. Appl. No. 16/922,273, Systems and Methods for Generating Security Improvement Plans for Entities, filed Jul. 7, 2020.
U.S. Appl. No. 29/677,306, Computer Display With Corporate Hierarchy Graphical User Interface Computer Display With Corporate Hierarchy Graphical User Interface, filed Jan. 18, 2019.
U.S. Appl. No. 16/775,840, Systems and Methods for Assessing Cybersecurity State of Entities Based on Computer Network Characterization, filed Jan. 29, 2020.
U.S. Appl. No. 17/018,587, Systems and Methods for Assessing Cybersecurity State of Entities Based on Computer Network Characterization, filed Sep. 11, 2020.
U.S. Appl. No. 16/779,437, Systems and Methods for Rapidly Generating Security Ratings, filed Jan. 31, 2020.
U.S. Appl. No. 16/802,232, Systems and Methods for Improving a Security Profile of an Entity Based on Peer Security Profiles, filed Feb. 26, 2020.
U.S. Appl. No. 16/942,452, Systems and Methods for Improving a Security Profile of an Entity Based on Peer Security Profiles, filed Jul. 29, 2020.
U.S. Appl. No. 29/725,724, Computer Display with Risk Vectors Graphical User Interface, filed Feb. 26, 2020.
U.S. Appl. No. 29/736,641, Computer Display with Peer Analytics Graphical User Interface, filed Jun. 2, 2020.
U.S. Appl. No. 16/884,607, Systems and Methods for Managing Cybersecurity Alerts, filed May 27, 2020.
U.S. Appl. No. 15/271,655, the Office Actions dated Feb. 21, 2017 and Aug. 18, 2017.
U.S. Appl. No. 15/377,574, now U.S. Pat. no. 9,705,932, the Office Action dated Mar. 2, 2017 and the Notice of Allowance dated Jun. 1, 2017.

(56) References Cited

OTHER PUBLICATIONS

U.S. Appl. No. 14/021,585, now U.S. Pat. No. 9,438,615, the Office Action dated Mar. 11, 2016 and the Notice of Allowance dated Aug. 9, 2016.
U.S. Appl. No. 15/216,955, now U.S. Pat. No. 10,326,786, the Office Actions dated Nov. 4, 2015, Mar. 9, 2017, Jun. 6, 2017, Dec. 5, 2017, and Aug. 29, 2018, and the Notice of Allowance dated Feb. 6, 2019.
U.S. Appl. No. 15/239,063, now U.S. Pat. no. 10,341,370, the Office Action dated Mar. 21, 2018 and the Notice of Allowance dated Jan. 14, 2019.
U.S. Appl. No. 16/405,121, the Office Actions dated Aug. 1, 2019 and Nov. 21, 2019 and the Notice of Allowance dated May 22, 2020 and Jul. 10, 2020.
U.S. Appl. No. 13/240,572, the Office Actions dated Nov. 21, 2013, Jun. 16, 2014, Feb. 27, 2015, Jun. 3, 2015, Oct. 26, 2015, Mar. 10, 2016 Feb. 13, 2017; and the Notice of Allowance dated Jun. 1, 2020.
U.S. Appl. No. 14/944,484, now U.S. Pat. No. 9,973,524, the Office Actions dated Mar. 11, 2016, Jul. 5, 2016, and Jan. 17, 2017 and the Notice of Allowance dated Oct. 20, 2017.
U.S. Appl. No. 15/142,677, now U.S. Pat. No. 9,830,569, the Office Actions dated Jul. 26, 2016, and Apr. 24, 2017 and the Notice of Allowance dated Oct. 11, 2017.
U.S. Appl. No. 15/134,845, now U.S. Pat. No. 9,680,858, the Office Actions dated Jul. 19, 2016 and Jan. 26, 2017, and the Notices of Allowances dated Apr. 27, 2017 and May 9, 2017.
U.S. Appl. No. 15/044,952, the Office Actions dated Jul. 8, 2019 and Feb. 21, 2020.
U.S. Appl. No. 15/089,375, now U.S. Pat. No. 10,176,445, the Office Actions dated Sep. 9, 2016, May 17, 2017, and Nov. 17, 2017 and the Notice of Allowance dated Aug. 9, 2018.
U.S. Appl. No. 29/598,298, now U.S. Pat. No. D835,631, the Notice of Allowance dated Aug. 15, 2018.
U.S. Appl. No. 29/598,299, now U.S. Pat. No. D818,475, the Notice of Allowance dated Jan. 2, 2018.
U.S. Appl. No. 29/599,622, now U.S. Pat. No. D847,169, the Notice of Allowance dated Dec. 11, 2018.
U.S. Appl. No. 29/599,620, now U.S. Pat. No. D846,562, the Office Action dated May 3, 2018, the Notice of Allowance dated Nov. 27, 2018.
U.S. Appl. No. 16/015,686, now U.S. Pat. No. 10,425,380, the Office Action dated Nov. 16, 2018 and the Notice of Allowance dated May 10, 2019.
U.S. Appl. No. 16/543,075, the Notice of Allowance dated Sep. 25, 2019.
U.S. Appl. No. 16/738,825, the Office Action dated Feb. 26, 2020 and the Notice of Allowance dated Sep. 9, 2020.
U.S. Appl. No. 15/918,286, now U.S. Pat. No. 10,257,219, the Office Action dated Aug. 7, 2018 and the Notice of Allowance dated Nov. 29, 2018.
U.S. Appl. No. 16/292,956, the Office Action dated Jul. 10, 2019 and the Notices of Allowance dated Jan. 8, 2020 and Jan. 27, 2020.
U.S. Appl. No. 16/795,056, the Office Action dated May 1, 2020 and the Notice of Allowance dated Oct. 29, 2020.
U.S. Appl. No. 16/170,680, the Office Action dated Mar. 26, 2019; the Notices of Allowance dated Oct. 29, 2019 and Aug. 27, 2019.
U.S. Appl. No. 16/688,647, the Office Action dated Jan. 29, 2020; the Notice of Allowance dated May 12, 2020.
U.S. Appl. No. 15/954,921, the Office Actions dated Sep. 4, 2018, Jan. 3, 2019, Aug. 19, 2019, and Dec. 5, 2019; Advisory Action dated Mar. 3, 2020, and the Notice of Allowance dated Jul. 7, 2020.
U.S. Appl. No. 17/014,495.
U.S. Appl. No. 16/787,650, the Notice of Allowance dated Apr. 7, 2020.
U.S. Appl. No. 16/583,991, the Office Action dated Jan. 13, 2020.
U.S. Appl. No. 29/666,942, the Notice of Allowance dated Apr. 30, 2020.
U.S. Appl. No. 16/360,641, the Office Action dated Aug. 7, 2019, Feb. 20, 2020, and Sep. 4, 2020.
U.S. Appl. No. 16/514,771, the Office Actiond dated Dec. 4, 2019; the Notice of Allowance dated Mar. 18, 2020.
U.S. Appl. No. 16/922,673, the Office Action dated Sep. 15, 2020.
U.S. Appl. No. 29/677,306, the Notice of Allowance dated Aug. 20, 2020.
U.S. Appl. No. 16/775,840, the Notice of Allowance dated May 19, 2020.
U.S. Appl. No. 17/018,587, Office Action dated Nov. 17, 2020.
U.S. Appl. No. 16/779,437, the Notice of Allowance dated Aug. 12, 2020, Oct. 26, 2020 and Nov. 9, 2020.
U.S. Appl. No. 16/802,232, the Notice of Allowance dated Apr. 24, 2020.
U.S. Appl. No. 16/942,452, Office Action dated Oct. 23, 2020.
"Agreed Upon Procedures," Version 4.0, Bits, The Financial Institution Shared Assessments Program, Assessment Guide, Sep. 2008, 56 pages.
"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Master Security Criteria," Version 3.0, Bits Financial Services Security Laboratory, Oct. 2001, 47 pages.
"Plugging the Right Holes," Lab Notes, MIT Lincoln Library, Posted Jul. 2008, retrieved Sep. 14, 2010 from http://www.II.miLedufpublicationsflabnotesfpluggingtherightho! . . . , 2 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business Risk Team, 52 pages.
Artz, Michael Lyle, "NetSPA: A Network Security Planning Architecture," Massachusetts Institute of Technology, May 24, 2002, 97 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buehler, Kevin S., et al., "Running with risk," The McKinsey Quarterly, No. 4, 2003, pp. 40-49.
Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.
Computer Network Graph-Bees, http://bioteams.com/2007/04/30/visualizing_complex_networks.html, date accessed Sep. 28, 2016, 2 pages.
Computer Network Graph-Univ. of Michigan, http://people.cst.cmich.edu/liao1q/research.shtml, date accessed Sep. 28, 2016, 5 pagse.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
The Dun & Bradstreet Corp. Stock Report, Standard & Poor's, Jun. 6, 2009, 8 pages.
Dun & Bradstreet, The DUNSRight Quality Process: Power Behind Quality Information, 24 pages.

(56) References Cited

OTHER PUBLICATIONS

Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Hacking Exposed 6, S. McClure et al., copyright 2009, 37 pages.
Ingols, Kyle, et al., "Modeling Modern Network Attacks and Countermeasures Using Attack Graphs," MIT Lincoln Laboratory, 16 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Practical Experiences Using SCAP to Aggregate CND Data," MIT Lincoln Library, Presentation to NIST SCAP Conference, Sep. 24, 2008, 59 pages.
Johnson, Eric, et al., "Information Risk and the Evolution of the Security Rating Industry," Mar. 24, 2009, 27 pages.
Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.
MaxMind, https://www.maxmind.com/en/about-maxmind,https://www.maxmind.com/en/geoip2-isp-database, date accessed Sep. 28, 20116, 3 pages.
Method Documentation, CNSS Risk Assessment Tool Version 1.1, Mar. 31, 2009, 24 pages.
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
Nye, John, "Avoiding Audit Overlap," Moody's Risk Services, Presentation, Source Boston, Mar. 14, 2008, 19 pages.
Paxson, Vern, "How The Pursuit of Truth Led Me to Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Rare Events, Oct. 2009, Jason, The MITRE Corporation, Oct. 2009, 104 pages.
Report to the Congress on Credit Scoring and Its Effects on the Availability and Affordability of Credit, Board of Governors of the Federal Reserve System, Aug. 2007, 304 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
RFC 1834, https://tools.ietf.org/html/rfc1834, date accessed Sep. 28, 2016, 7 pages.
SamSpade Network Inquiry Utility, https://www.sans.org/reading-room/whitepapers/tools/sam-spade-934, date accessed Sep. 28, 2016, 19 pages.
SBIR Phase 1: Enterprise Cyber Security Scoring, CyberAnalytix, LLC, http://www.nsf.gov/awardsearch/showAward.do?AwardNumber=I013603, Apr. 28, 2010, 2 pages.
Security Warrior, Cyrus Peikari, Anton, Chapter 8: Reconnaissance, 6 pages.
Snort Intrusion Monitoring System, http://archive.oreilly.com/pub/h/1393, date accessed Sep. 28, 2016, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics v1.0.0, The Center for Internet Security, May 11, 2009, 90 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wikipedia, https://en.wikipedia.org/wiki/Crowdsourcing, date accessed Sep. 28, 2016, 25 pages.
Williams, Leevar, et al., "Garnet: A Graphical Attack Graph and Reachability Network Evaluation Tool," MIT Lincoln Library, VizSEC 2009, pp. 44-59.
Williams, Leevar, et al., "An Interactive Attack Graph Cascade and Reachability Display," MIT Lincoln Laboratory, 17 pages.
BitSight, "Cyber Security Myths Versus Reality: How Optimism Bias Contributes to Inaccurate Perceptions of Risk", Jun. 2015, Dimensional Research, pp. 1-9.
U.S. Appl. No. 13/240,572, filed Oct. 7, 2015, application as filed and pending claims, 45 pages.
U.S. Appl. No. 61/386,156, filed Oct. 7, 2015. 2 pages.
U.S. Appl. No. 13/240,572 and pending claims as of Mar. 22, 2016, 10 pages.
U.S. Appl. No. 14/944,484 and pending claims as of Mar. 22, 2016, 4 pages.
Provos et al., "The Ghost in the Browser Analysis of Web-based Malware", 2007 (9 pages).
Li et al., "Finding the Linchpins of the Dark Web: a Study on Topologically Dedicated Hosts on Malicious Web Infrastructures", IEEE, 2013 (15 pages).
Bhilare et al., "Protecting Intellectual Property and Sensitive Information in Academic Campuses from Trusted Insiders: Leveraging Active Directory", SIGUCC, Oct. 2009 (5 pages).
Jin et al, "Identifying and tracking suspicious activities through IP gray space analysis", MineNet, Jun. 12, 2007 (6 pages).
Chuvakin, "SIEM: Moving beyond compliance", RSA White Paper (2010) (16 pages).
U.S. Appl. No. 14/021,585, filed Oct. 7, 2015 and application as filed, 70 pages.
U.S. Appl. No. 14/021,585, filed Apr. 29, 2016, 2 pages.
U.S. Appl. No. 14/944,484, filed Apr. 29, 2016, 4 pages.
U.S. Appl. No. 13/240,572, filed Apr. 29, 2016, 46 pages.
U.S. Appl. No. 14/021,585 and pending claims as of Mar. 22, 2016, 2 pages.
U.S. Appl. No. 14/021,585, filed Nov. 18, 2015, 6 pages.
Application as filed, U.S. Appl. No. 13/240,572, filed Nov. 18, 2015, 45 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber=5976796. 8 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Gephi (gephi.org), accessed on the internet at https://web.archive.org/web/20151216223216/https://gephi.org/; Dec. 16, 2015; 1 page.
mile 2 CPTE Maltego Demo, accessed on the internet at https://www.youtube.com/watch?v=o2oNKOUzPOU; Jul. 12, 2012; 1 page.
"Neo4j (neo4j.com)," accessed on the Internet at https://web.archive.org/web/20151220150341/http://neo4j.com:80/developer/guide-data-visualization/; Dec. 20, 2015; 1 page.
"Creating Transparency with Palantir," accessed on the Internet at https://www.youtibe.com/watch?v=8cbGChfagUA; Jul. 5, 2012; 1 page.
"Palantir Cyber: Uncovering malicious behavior at petabyte scale," accessed on the Internet at https://www.youtube.com/watch?v=EhYezV06EE; Dec. 21, 2012; 1 page.

(56) References Cited

OTHER PUBLICATIONS

Borgatti, et al., "On Social Network Analysis in a Supply Chain Context," Journal of Supply Chain Management; 45(2): 5-22; Apr. 2009, 18 pages.

Carstens, et al., "Modeling Company Risk and Importance in Supply Graphs," European Semantic Web Conference 2017: The Semantic Web pp. 18-31.

Gundert, Levi, "Big Data in Security—Part III: Graph Analytics," accessed on the Internet at https://blogs.cisco.com/security/big-data-in-security-part-Hi-graph-analytics; Cisco Blog, Dec. 2013, 8 pages.

Jean, "Cyber Security: How to use graphs to do an attack analysis," accessed on the Internet at https://linkurio.us/blog/cyber-security-use-graphs-attack-analysis/; Aug. 2014, 11 pages.

"Palantir.com," accessed on the Internet at http://www.palantir.com/; Dec. 2015; 2 pages.

KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.

"Maltego XL," accessed on the Internet at https://www.paterva.com/web7/buy/maltegoclients/maltego-xl.php, 5 pages.

Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.

Noel, et al., "Big-Data Architecture for Cyber Attack Graphs, Representing Security Relationships in NoSQL Graph Databases," The MITRE Corporation, 2014, 6 pages.

Wagner, et al., "Assessing the vulnerability of supply chains using graph theory," Int. J. Production Economics 126 (2010) 121-129.

Moradi, et al., "Quantitative Models for Supply Chain Management," IGI Global, 2012, 29 pages.

Joslyn, et al., "Massive Scale Cyber Traffic Analysis: A Driver for Graph Database Research," Proceedings of the First International Workshop on Graph Data Management Experience and Systems (GRADES 2013), 6 pages.

"About Neo4j," 1 page.

"Amazon Mechanical Turk," accessed on the internet at https://www.mturk.com/; 7 pages.

"Rapid? Nexpose Vulnerability Scanner," accessed on the internet at https://www.rapid7.com/products.nexpose/download/, 3 pages.

"Tenable Nessus Network Vulnerability Scanner," accessed on the internet at https://www.tenable.com/products/nessus/nessus-professional; 13 pages.

"Computer Network Graph," http://www.opte.org; 1 page.

McNab, "Network Security Assessment," copyright 2004, 56 pages.

Gilgur, et al., "Percentile-Based Approach to Forecasting Workload Growth" Proceedings of CMG'15 Performance and Capacity International Conference by the Computer Measurement Group. No. 2015 (Year:2015).

Seneviratne et al., "SSIDs in the Wild: Extracting Semantic Information from WiFi SSIDs" HAL archives-ouvertes.fr, HAL Id: hal-01181254, Jul. 29, 2015, 5 pages.

Search Query Report form IPcom (performed Apr. 27, 2020).

Camelo et al., "CONDESNER: A Graph-Based Approach for Detecting Botnets," AnubisNetworks R&D, Amadora, Portugal, 8 pages.

Camelo, "Botnet Cluster Identification," Sep. 2014, 2 pages.

Azman, Mohamed et al. Wireless Daisy Chain and Tree Topology Networks for Smart Cities. 2019 IEEE International Conference on Electrical, Computer and Communication Technologies (ICECCT). https://ieeexplore.ieee.org/stamp/stamp.jsp?tp=&arnumber=8869252 (Year: 2019).

Basinya, Evgeny A.; Yushmanov, Anton A. Development of a Comprehensive Security System. 2019 Dynamics of Systems, Mechanisms and Machines (Dynamics). https://ieeexplore.ieee.org/stamp/stamp.jsp?tp=&arnumber=8944700 (Year: 2019).

Luo, Hui; Henry, Paul. A Secure Public Wireless LAN Access Technique That Supports Walk-Up Users. GLOBECOM '03. IEEE Global Telecommunications Conference. https://ieeexplore.ieee.org/stamp/stamp.jsp?tp=&arnumber=1258471 (Year: 2003).

Seigneur et al., A Survey of Trust and Risk Metrics for a Byod Mobile Worker World: Third International Conference on Social Eco-Informatics, 2013, 11 pages.

Buckshaw, Donald L., "Use of Decision Support Techniques for Information System Risk Management," submitted for publication in Wiley's Encyclopedia of Quantitative Risk Assessment in Jan. 2007, 11 pages.

\* cited by examiner

SYSTEMS AND METHODS FOR DETERMINING ASSET IMPORTANCE IN SECURITY RISK MANAGEMENT

CROSS-REFERENCE TO RELATED APPLICATION

This application claims priority to and the benefit of U.S. Provisional Patent Application No. 62/908,565 titled "Systems and Methods for Determining Asset Importance in Security Risk Management" and filed on Sep. 30, 2019, the entirety of which is incorporated herein by reference.

TECHNICAL FIELD

The following disclosure is directed to methods and systems for determining asset importance for an entity and, more specifically, methods and systems for determining importance of hosts and/or IP addresses of an entity.

BACKGROUND

An organization may desire to evaluate the importance of its assets, for example, for monetary or security purposes. Typically, many physical assets can be readily identified and evaluated based on their apparent characteristics (e.g., real estate, specialized equipment, list of customers, etc.). Further, in many instances, these physical assets can be evaluated based on a specified characteristic, e.g., market value or significance to the business of the entity, and in many cases by a layperson. However, identifying and/or evaluating computer network assets for modern entities can be more challenging as the value or significance of such assets are not easily ascertained without specialized knowledge or tools.

SUMMARY

Disclosed herein are methods and systems for determining asset importance for an entity. Specifically, the importance of network assets, e.g., hosts and/or IP addresses, of an entity can be evaluated and ranked. The importance of these assets can be presented to a user who is tasked with understanding or evaluating the importance of the entity's assets for, e.g., security or monetary purposes.

In one aspect, the disclosure features a computer-implemented method for ranking importance of assets of an entity, in which the assets include hosts associated with the entity. The method can include receiving at least one of: (a) a first dataset comprising (i) a respective plurality of hostnames of a plurality of hosts and (ii) lookup counts for each hostname of the plurality of hostnames, the lookup counts obtained from a stream of a domain name system (DNS) queries; (b) a second dataset comprising source code for a plurality of websites indicating, for each website, whether a host of the website is configured to collect data from users, the websites associated with the entity; or (c) a third dataset comprising a plurality of authentication certificates associated with at least one of the plurality of hosts. The method can include determining input data based on the received at least one first dataset, second dataset, or third dataset such that: (a) when the first dataset is received, determining a first input data comprising, for each host of the plurality of hosts, a ratio of (a) a number of lookup counts of the hostname of the host to (b) a maximum number of lookup counts of the plurality of hostnames for the entity; (b) when the second dataset is received, determining a second input data indicating, for each host of the website, whether the source code indicates that the host is configured to collect data from users of the website; and (c) when the third dataset is received, determining a third input data indicating, for the at least one host, whether the host has an authentication certificate. The method can include determining, for each host associated with the entity, a host importance ranking based on the determined input data.

Various embodiments of the exemplary method can include one or more of the following features.

The method can include receiving at least two of the first dataset, second dataset, or third dataset; and determining, for each host associated with the entity, the host importance ranking based on a weighting of the at least two of the first input data, the second input data, or the third input data. The method can include receiving the first dataset, in which determining, for each host associated with the entity, the host importance ranking further can include if the lookup count is zero, determining that the host importance ranking is lower than a host associated with (i) one or more lookup counts, (ii) source code indicating that the host is configured to collect data from users of the website, or (iii) an authentication certificate. The method can include receiving the first dataset, second dataset, and third dataset; determining, for each host associated with the entity, the host importance ranking based on the weighting of the first input data, the second input data, and the third input data; and determining a maximum of: (i) the first input data; and (ii) a sum of: (a) the first input data multiplied by a first weight; (b) the second input data multiplied by a second weight; and (c) the third input data multiplied by a third weight.

The method can include, if the lookup count is at least one, setting the first weight to equal to the second weight and the third weight to equal to less than the first weight, such that the sum of the first weight, the second weight, and the third weight is equal to one; and if the lookup count is zero, setting a sum of the second weight and the third weight to equal less than the first weight. The method can include assigning a unique identifier to each host associated with the entity. The first dataset can include lookup counts for each hostname over seven consecutive days. The source code can include HTML data for the plurality of websites.

When the second dataset is received, determining the second input data can include determining whether the source code indicates that the website includes a form for collecting data from the users of the website. When the second dataset is received, determining the second input data can include excluding those websites in which the form collects only search queries. The method can include presenting the host importance ranking in a user interface. When the second dataset is received, determining the second input data can include collecting a URL of the website, in which presenting the host importance ranking in a user interface can include presenting the URL of the website with the corresponding host.

The assets can include Internet Protocol (IP) addresses associated with the entity. The method can include receiving at least one of: (a) a fourth dataset comprising (i) a plurality of IP addresses and (ii) lookup counts for each IP address of the plurality of IP addresses; (b) a fifth dataset comprising at least one service or application type associated with at least one IP address associated with the entity; (c) a sixth dataset comprising fingerprints and/or cookies associated with another plurality of IP addresses associated with the entity. The method can include determining additional input data based on the received at least one fourth dataset, fifth dataset, or sixth dataset such that: (a) when the fourth dataset is received, determining a fourth input data comprising a ratio of (i) a number of lookup counts of the IP addresses to (ii) a maximum number of lookup counts of the IP addresses for the entity; (b) when the fifth dataset is received, determining a fifth input data comprising a ranking of the at least one service or application type, the ranking determined by comparing each service or application type to a database of pre-ranked service or application types; (c) when the sixth dataset is received, determining a sixth input data comprising a ratio of (a) a number of unique fingerprints and/or unique cookies of an IP address of the other plurality of IP addresses to (b) a maximum of numbers of unique fingerprints and/or unique cookies for the other plurality of IP addresses of the entity; and determining, for each IP address associated with the entity, an IP address importance ranking based on the determined additional input data.

The method can include determining, for each IP address of the entity, the IP address importance ranking based on a weighting of the at least two of the fourth input data, the fifth input data, the sixth input data, or the host importance ranking. The fifth dataset can include at least two service or application types for a particular IP address of the at least one IP address, and, when the fifth dataset is received, determining the fifth input data can include determining the ranking of the at least two or application service types; and retaining a ranking of a highest ranked service or application type of the at least two service or application types. The fifth dataset can include at least thirty days of data related to the at least one service or application type. When the fifth dataset is received, determining the fifth input data can include ranking the at least one service or application type based on a function and/or a criticality of a corresponding service or application having the at least one service or application type. The sixth dataset can include infection status of systems associated with the other plurality of IP addresses. The infection status of systems can include a measure of malware families identified to be associated with the other plurality of IP addresses.

The sixth input data can include a ratio of (i) a number of unique malware families associated with a particular IP address of the other plurality of IP addresses to (ii) a maximum of numbers of unique malware families associated with the other plurality of IP addresses. The sixth dataset can include at least sixty days of data related to fingerprints and/or cookies associated with the other plurality of IP addresses. The method can include receiving the fourth dataset, the fifth dataset, and the sixth dataset, in which determining, for each IP address of the entity, the IP address importance ranking is based on a maximum value from the group consisting of: the fourth input data, the fifth input data, the sixth input data, and the host importance ranking. The method can include, for at least one IP address, setting the IP address importance ranking to equal to or greater than the host importance ranking of a host associated with the at least one IP address.

In another aspect, the disclosure features a method for ranking importance of assets of an entity, in which the assets can include Internet Protocol (IP) addresses associated with the entity. The method can include receiving at least one of: (a) a fourth dataset comprising (i) a plurality of IP addresses and (ii) lookup counts for each IP address of the plurality of IP addresses; (b) a fifth dataset comprising at least one service or application type associated with at least one IP address associated with the entity; (c) a sixth dataset comprising fingerprints and/or cookies associated with another plurality of IP addresses associated with the entity. The method can include determining additional input data based on the received at least one fourth dataset, fifth dataset, or sixth dataset such that: (a) when the fourth dataset is received, determining a fourth input data comprising a ratio of (i) a number of lookup counts of the IP addresses to (ii) a maximum number of lookup counts of the IP addresses for the entity; (b) when the fifth dataset is received, determining a fifth input data comprising a ranking of the at least one service or application type, the ranking determined by comparing each service or application type to a database of pre-ranked service or application types; (c) when the sixth dataset is received, determining a sixth input data comprising a ratio of (a) a number of unique fingerprints and/or unique cookies of an IP address of the other plurality of IP addresses to (b) a maximum of numbers of unique fingerprints and/or unique cookies for the other plurality of IP addresses of the entity; and determining, for each IP address associated with the entity, an IP address importance ranking based on the determined additional input data.

DETAILED DESCRIPTION

Figure 1A:
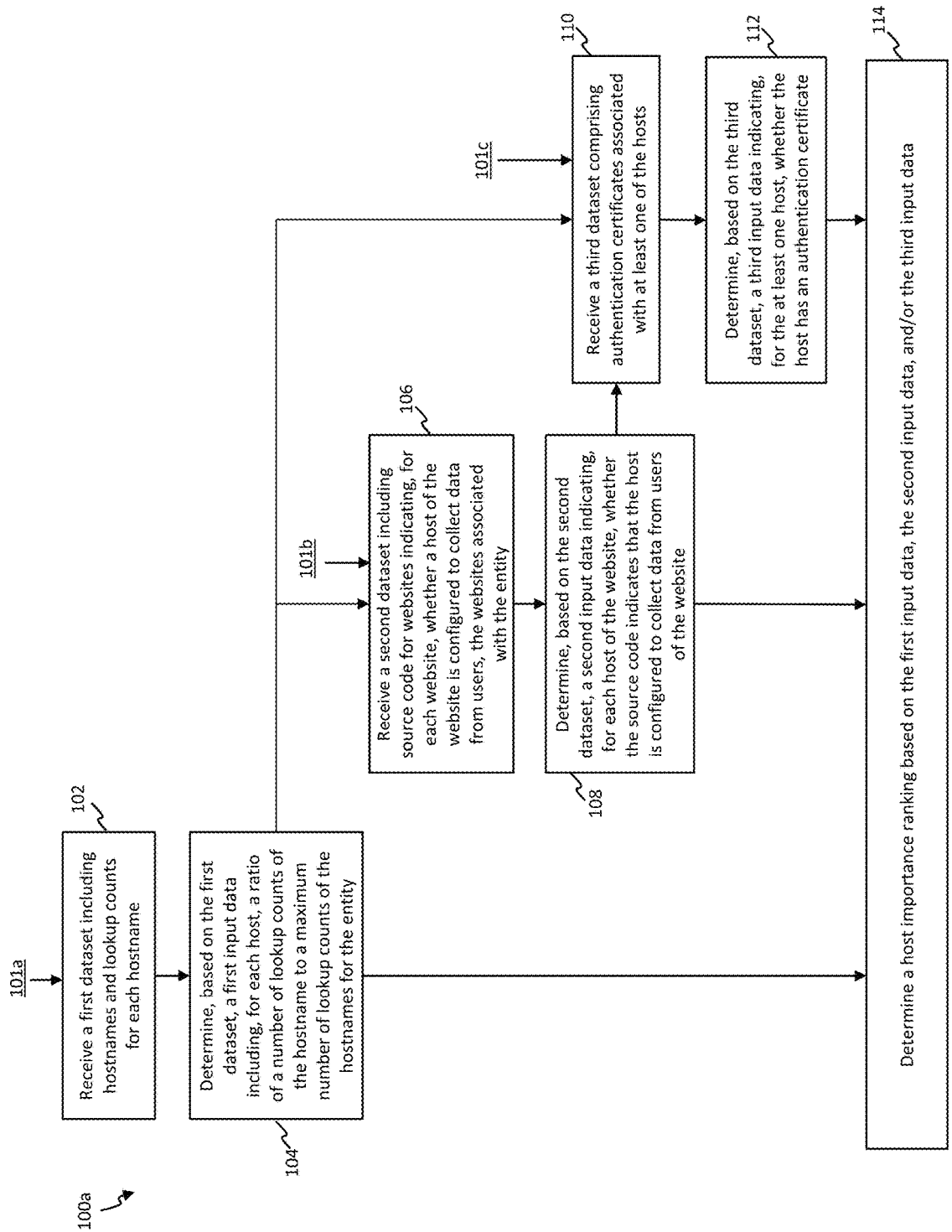
FIG. 1A is a flowchart of an exemplary method for determining host importance to an entity.

Disclosed herein are exemplary embodiments of systems and methods for determining importance of assets of an entity. The importance of the entity assets may be the importance to the entity that has or controls the assets or the importance to a third-party entity (e.g., in a business relationship with the entity, having an economic dependence with the entity, a security monitoring agent of the entity, a governmental body regulating the entity, etc.). An entity can be any organization, e.g., a company, an educational institution, a government, a group, etc. In various embodiments, the exemplary systems and methods described herein enable ranking the importance of computer network assets (e.g., hosts, IP addresses, etc.) to an entity. The importance of such assets may be resolved on an objective standard. For example, the importance of network assets can be determined in a similar fashion across entities, across industries, etc., thereby providing the entity or a third-party an unbiased evaluation. Importance of network assets (e.g., hosts, IP addresses, etc.) may be based on one or more factors including:

(i) The network traffic (e.g., to and/or from) associated with the asset. For example, the observed traffic to or from a host or IP address signifies the degree of use of the asset by an entity or by the entity's customers. This further can indicate the reliance of the entity and the entity's business on the particular network asset. Additionally, such hosts or IP addresses with significant traffic may become targets for malevolent actors and therefore warrant extra attention and/or security.

(ii) Whether the asset collects data inputted by users (e.g., customers, patients, etc.) of the entity. For example, a host of a website collecting users' personal data, sensitive data, operation-critical data, etc. may have greater value to an entity over hosts of websites that simply display web content.

(iii) Whether the asset requires authentication (e.g., via certificates, passwords, multi-factor). For example, a host considered to be a vital asset by an entity may require users to authenticate themselves to access privileged information, or an entity may provision an authentication certificate (e.g., an Extended Validation (EV) certificate) for securing web communication, signing electronic documents, etc.

(iv) Whether the asset provides a valuable service for or by the entity. For example, IP addresses associated with databases, authentication protocols, communication services, network remote access, industrial control systems, system remote access, network infrastructure, and/or file exchange may be critical for the operation of the entity's business and therefore deemed to have greater importance than, e.g., an IP address associated with a device hosting web content alone.

(v) The fingerprints and/or cookies associated with egress IP addresses associated with the entity. For example, the monitoring of the fingerprint and/or cookie-related data can aid in determining the number of unique devices associated with an IP address. A greater number of unique devices may signify greater utilization rate of a particular IP address, thereby uncovering the importance of that IP address to the entity.

(vi) The security status of an IP address of the entity. For example, determining whether an asset is compromised (e.g., infected, attacked, etc.) can reveal that the particular asset is a target for malevolent actors and therefore warrant extra attention and/or security.

(vii) The configuration of the applications operating on a system of the entity. For example, an entity may invest significant effort configuring a website to appear higher in search engine results to drive more users and additional activity to that system (e.g., search engine optimization practices, etc.). Therefore, the importance of such a system may be ranked higher than those without extensive or any particular configuration.

(viii) The interconnectedness and referential nature of assets across specific applications. For example, an entity may frequently cite a particular asset, such as an email address or link to another website, across a number of its applications and assets, and the popularity of the frequency of mentions can signify the importance of a given asset.

Having accurate and digestible data about the importance of network assets may enable an entity or a third-party to make decisions about the network assets themselves and/or the operations of the entity, including security decisions.

Network Asset Importance

In some embodiments, the importance of network assets (e.g., hosts, IP addresses, etc.) of an entity can be determined based on one or more datasets. An exemplary method for determining the importance of network assets can include receiving one or more of the following data:

Frequency of system access. The frequency with which an entity system is accessed. For example, this frequency can be determined based on passive DNS data; frequency of flows, large duration flows, and/or high-throughput flows as represented in Netflow data; the frequency with which a particular entity asset is linked, called from, or referred to on websites (e.g., external to the entity and/or websites managed or controlled by the entity); the number of users and/or devices using an entity IP address as an egress IP address; the number of infected entity systems on a particular IP address; the number of real-time blacklist (RBL) record lookups for domains or IP addresses; the number of (i) sender policy framework (SPF) record lookups or (ii) domain-based message authentication, reporting, and conformance (DMARC) record lookups for domains (and/or the IP addresses indicated in those records); and/or the frequency of TLS/SSL certificates for given domains or subdomains within subject names or subject alternative names.

System configuration. One or more aspects of the configuration of an entity system. For example, the aspects can include the use of authentication certificates (e.g., EV certificates, etc.); the type of services or applications enabled on the entity system (e.g., an instant messaging protocol, an email system, a SSL VPN system, a router, a firewall, an SSO authentication solution, secure file sharing services, etc.); whether a system administrator defined search engine optimization (SEO) related configuration(s); whether the system has a programmatic interface and the type of programmatic interface; whether the system has dependencies for other business functions or applications (e.g., if a system is required to be available for a mobile application to function correctly, etc.); one or more characteristics of the physical hardware associated with the system (e.g., if the IP address is associated with the entity's wireless infrastructure, etc.); and/or administratively assigned identifiers on assets for external service verification and/or ownership purposes.

Application configuration. One or more aspects of an application's configuration (e.g., functionality, inputs, outputs, etc.). For example, the configuration can be determined based on whether the application accepts user-submitted data and/or the types of data served to users of the application (e.g., text only, multimedia content, personally identifiable data, etc.); the presence of entity brand assets (e.g., logos for the entity, its subsidiaries, or its derivative products); whether the application is used solely within an organization or whether the application is used by non-entity employees or external customers, and/or the support for specific high-level application functions (e.g., shopping cart functionality, etc.).

Examples of the above-referenced data can be found throughout the instant disclosure. The exemplary method may include determining input data into a weighting algorithm for ranking the one or more network assets. The exemplary method may include determining the asset importance ranking based on one or more of the input data. One or more of the datasets described above can be received, obtained, and/or collected via a one or more receiving, retrieval, or collection methods to be used in the systems and methods discussed herein.

Frequency of System Access

In some embodiments, the exemplary systems and methods receive frequency of lookups from passive DNS data. Accordingly, passive DNS data may be collected from one or more sources, including resolvers associated with Internet Service Provider (ISP) networks, resolvers associated with entity networks, open resolvers available on the Internet for open use, etc. In some embodiments, the system may preserve duplicates of queries (e.g., may not deduplicate queries) received by the resolver. In other embodiments, if the system does deduplicate queries, the system may record a count of the number of distinct queries received by the resolver over the deduplication period. In a preferred embodiment, the passive DNS data can be uniformly distributed to the extent possible so as to reduce biases introduced by the local users of the systems querying the resolvers (e.g., through cultural or geographic biases). Two or more passive DNS datasets may be combined together if they are collected and/or processed in the same or similar ways.

In some embodiments, the exemplary systems and methods receive frequency of flows, large duration flows, and/or high-throughput flows as represented in Netflow data. Accordingly, Netflow data may be received, obtained, or collected from one or more sources. For instance, a sensor or router may be configured to collect Netflow data within one or more ISPs, within one or more Internet Exchange Points, within one or more entity networks, and/or within any other router that observes Internet traffic between a source and a destination. In a preferred embodiment, the Netflow collection can be distributed among different sensors or routers so as to reduce biases introduced by the local users of the systems making connections through those sensors or routers (e.g., representing cultural or geographic biases into the resulting data). Two or more Netflow datasets may be combined together if they are collected and/or processed in the same or similar ways.

In some embodiments, the exemplary systems and methods receive the frequency with which a particular entity asset is linked, called from, or referred to on websites. Such frequency information may be collected by using known web crawling techniques in which a programmatic application visits a website, collects information about its content, and identifies the links that appear on the website. The application may subsequently visit those links and repeat that process. Such crawling is commonly seen within search engines or other applications that are configured to collect contextual information about websites. In some embodiments, this data is reduced down to a set of origin and destination links, enriched by the entity that represents the source and the destination websites. In some cases, the frequency of distinct inbound links (also discussed as "references") to a given destination asset (e.g., its domains and/or IP addresses) represent information useful for determining asset importance. In some embodiments, such information can be related to links with an origin and a destination associated with the same entity. Information associated with the entity may be weighted more in determining asset importance as compared to links from external origins.

In some embodiments, the exemplary systems and methods receive the number of users and/or devices using an entity IP address as an egress IP address. The number of users and/or devices may be determined from data indicating the IP addresses of users. User IP addresses can be determined in instances when users interact with web services or other external assets outside of the user's network. User interaction may be determined from network traffic associated with an application on a desktop workstation or mobile device. The IP addresses and contextual information may be obtained through the logs and other information collected by those web services or other external assets. Determining which IP addresses are egress addresses can be beneficial. However, more information may be determined by using application-unique identifiers to estimate the volume of the number of distinct users or devices behind a given set of IP addresses. This estimate can be used to rank the importance of egress IP addresses. In some embodiments, such information can be related to IP addresses that are in use by individuals and not programmatic systems or infrastructure. In some cases, this information may be weighted more in determining asset importance as compared to IP addresses in use by programmatic systems or infrastructure.

In some embodiments, the exemplary systems and methods receive the number of infected entity systems on a particular IP address. The number of infected entity systems can be collected by analyzing and identifying the IP addresses associated with devices that have a malware infection behind those networks. This information can be determined through various techniques (e.g., sinkholing and other known botnet tracking techniques). In some embodiments, an IP address that is associated with a device infected with malware but that does not show up as an egress IP address through the above-described method may not be assigned a higher rank than an egress IP address. This situation may occur due to the communication methods that malware utilize.

In some embodiments, the systems and methods receive the number of real-time blacklist (RBL) record lookups. The number of RBL record lookups can be collected by assessing the logs of the operators of RBL systems and determining the frequency of queried assets. These IP addresses may represent the type of activity described above with regard to egress IP addresses. These IP addresses may more commonly be associated with infrastructure (e.g., SMTP servers) due to the nature of how RBL systems are used. Alternatively, this information can be estimated from queries observed in passive DNS data to known RBL services. The queried asset may imply different information depending on the context of the RBL services. For example, an IP address or domain queried to an RBL system that tracks known spam actors may indicate that the asset was used to send email. Likewise, a domain that is queried to an RBL system that tracks malicious websites may indicate that an individual or programmatic system attempted to access that website.

In some embodiments, the systems and methods receive the number of sender policy framework (SPF) or domain-based message authentication, reporting & conformance (DMARC) record lookups. Such record lookups can be determined by assessing the logs of common operators of DNS services for domain names (authoritative name servers), or through passive DNS. The queries of domains via one or more of these email protection techniques can indicate that an email was received by a mail system whose origin represents that domain name, implying that this domain is being used by an associated organization (or a malicious actor) for email-related purposes. The frequency of these lookups may indicate how frequently the domain is used for email and/or as an input into the asset importance determination. For the SPF technology, additional information may be included in those DNS records that represent the IP addresses permitted to send email for the particular queried domain. This information may be provided as an input into the exemplary system.

In some embodiments, the systems and methods receive the frequency of TLS/SSL certificates for given domains or subdomains within subject names or subject alternative names. This frequency information can be determined via similar mechanisms described above for the frequency of linked assets on web services by crawling the Internet. However, instead of saving the context of the links between origin and destination, the TLS/SSL certificates that the web crawling system encounters may be saved with its origin information. TLS/SSL certificates may be collected by scanning IPv4 or IPv6 addresses using a protocol that implements the TLS protocol. Once certificates have been collected, domains can be extracted from the subject name or subject alternative name fields to determine the frequency for which domains appear within the unique set of valid certificates.

System Configuration

In some embodiments, the exemplary systems and methods receive authentication certificates (e.g., EV certificates, etc.). Authentication certificates may be collected via (i) the same or similar methods described above for the frequency of TLS/SSL certificates for given domains or subdomains, (ii) crawling the Internet, and/or (iii) scanning TLS/SSL-enabled application protocols. The resulting certificates can be processed to determine whether they have the OID representing an EV certificate as included by the certificate authority.

In some embodiments, the exemplary systems and methods receive the type of services or applications enabled on the entity system. The types of services or applications can be determined by scanning the IP address space (e.g., IPv4 and/or IPv6 address space) and communicating with systems associated with the respective IP addresses over one or more application-layer protocols to understand whether entity systems have those services available. Additionally or alternatively, the system can be configured to process the results to determine the applications operating a particular service or services (e.g., that the web service is an SSO solution, the administrative panel for their CMS, the bug tracking system, a business-to-business application, etc.). The application(s) can be determined by assessing the response of the protocol transactions and mapping or fingerprinting characteristics of that response to known applications matching those characteristics.

In some embodiments, the exemplary systems and methods receive data related to whether a system administrator defined search engine optimization (SEO) related configuration(s). This information can be determined by crawling the Internet and can be found within the context of a website. SEO optimization can take one of many forms, including HTML meta tags indicating keywords, descriptions, or other metadata about the website. These same fields can include links back to organizational contact information or other data (e.g., icons) to use when rendering the web application. Determining the websites that have been configured to use administratively-defined SEO information can be used inform the website's importance.

In some embodiments, the exemplary systems and methods receive data related to whether the system has a programmatic interface and the type of programmatic interface. This information can be collected by crawling the Internet or by scanning the Internet across the IP address space (e.g., IPv4 and/or IPv6 address space). Application programming interfaces (APIs) are typically used by other web applications or the entity operations between other business partners or between the entity and its customers or users. These APIs can be identified through their responses to the system interrogating their respective services. For example, an IP address hosting an HTTPS service on port 443 which replies back with a content type of "application/j son" is likely an API considering a direct user. Human-based interaction with the API would result in the application returning a different content type. This content type, and other artifacts, may vary based on the URL or requested resource on the web application. Accordingly, the observations related to the API can be tracked and provided to the system for determining asset importance.

In some embodiments, the exemplary systems and methods receive data related to whether the system has dependencies for other business functions or applications. This information can be collected through one or more of the following methods. In identifying dependencies for web applications, this information can be gathered by crawling the Internet using a headless browser or other application that can process JavaScript and/or dynamic web applications. In identifying dependencies for mobile applications, dynamic and static analysis systems can be used to analyze an entity's mobile applications across one or more platforms. The dependencies that are identified are analogous to those of links identified between various web applications. However, for identified dependencies, a web application depends on identifying systems for loading code or other resources for the web application to function correctly.

In some embodiments, the exemplary systems and methods receive one or more characteristics of the physical hardware associated with the system. These characteristics can be collected via applications that gather network information of devices that are connected to that local network. In identifying wireless infrastructure, an application on workstations or mobile devices may be used to extract such characteristics if these workstations or mobile devices are connected to those networks.

In some embodiments, the exemplary systems and methods receive administratively assigned identifiers on one or more assets for external service and/or ownership verification purposes. One or more assigned identifiers can be collected by one or more methods based on the verification actions being performed. For example, for some cloud-based solutions, the entity may require the administrator to prove ownership of a domain by adding a DNS record for that domain with specific values. The active or passive collection of these DNS records can provide insight into the services that are dependent on those domains and accordingly be used as an input for determining a domain's importance.

Application Configuration

In some embodiments, the exemplary system and methods can receive data related to whether the application accepts user-submitted data, whether the users are members of a particular entity or the general public, and/or the types of data served to users of the application. This information can be collected by crawling the Internet. In a preferred embodiment, this information is collected using a headless browser or other applications that can interpret and/or process dynamic web applications. The home webpage of the host may be processed. In some cases, multiple web pages on the same web application beyond the home webpage of the host may be processed. From the resulting data, indicators that the web application supports user-submitted information can be determined. This can include discovering common fields and field names on a web page that is indicative of user input (e.g., those identified relating to email addresses, logins, passwords, physical addresses, comments, etc.). In some embodiments, the web application actions that are available to the user can be used. For example, web applications can have forms that the user's browser is instructed to submit information via HTTP POST to the web application. In such cases, the user submits some user or application-defined content back to the web site.

In some embodiments, the exemplary systems and methods receive data related to the presence of entity brand assets (e.g., logos) for the entity, its subsidiaries, or its derivative products. This information can be gathered by crawling the Internet. In a preferred embodiment, this information can be collected using a headless browser or other applications that can interpret and/or process dynamic web applications. The home webpage of the host may be processed. In some cases, multiple web pages on the same web application beyond the home webpage of the host may be processed. In this case, images can be extracted from these crawls across the pages of the web application. One or more logos and/or trademarks can be collected for the given entity. These can be used as a reference to the given set of images observed in a particular website. The instance of an image closely matching an entity's logo or trademark can be indicative of the web application being important to the entity. Accordingly, the data related to entity brand assets can used as an input to determine asset importance.

In some embodiments, the exemplary systems and methods can receive data related to the support for specific high-level application functions. This information may be gathered by crawling the Internet. In a preferred embodiment, this information is collected using a headless browser or other applications that can interpret and/or process dynamic web applications. The home webpage of the host may be processed. In some cases, multiple web pages on the same web application beyond the home webpage of the host may be processed. In this case, application scripts and functions can be extracted and identified pertaining to specific activities that the application supports. For example, the application may support shopping cart functionality, which may in part be identified by common actions that are available (e.g., "add to cart", "purchase", etc.) or through specific identification of the application library that enables the function.

Host Importance

Figure 1B:
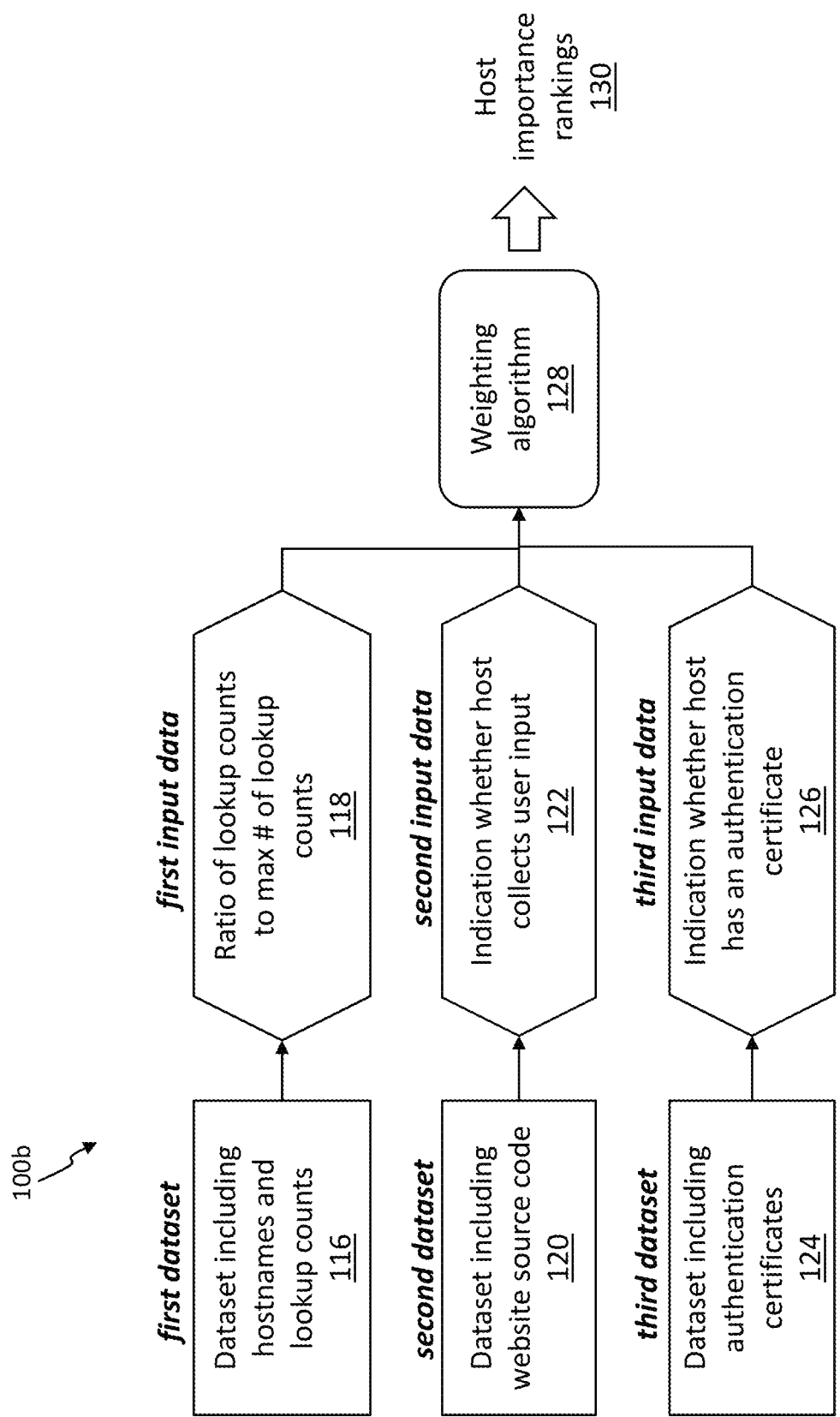
FIG. 1B is a diagram illustrating the data processing workflow according to the exemplary method of FIG. 1A.

FIG. 1A is a flowchart of an exemplary method 100a for determining importance of one or more hosts associated with an entity. FIG. 1B is a diagram illustrating the data processing workflow 100b according to the exemplary method of FIG. 1A. As used herein, a "host" of an entity can include a computer or other device (e.g., a server, a client, etc.) that can be connected to a computer network and communicate with other hosts. A host may be referred to as a "node" and have an assigned "hostname" that can be used to identify the host in, e.g., electronic communication. A host may be assigned to and/or associated with one or more IP addresses.

Exemplary method 100a may include one or more submethods 101a, 101b, 101c. For example, the method 100a may include submethods 101a and 101c or, in another example, method 101a may include submethod 101b. Exemplary step 102 of submethod 101a can include receiving a first dataset 116 including one or more hostnames of the hosts associated with the entity and lookup counts for each hostname. The lookup counts may be derived from a domain name system (DNS) cache and may represent traffic for a particular host. For example, the first dataset 116 may be collected manually, or the dataset 116 may be received from a third-party service (e.g., passive DNS dataset from one or more service providers).

Exemplary step 104 can include determining, based on the first dataset 116, a first input data 118 including, for each host, a ratio of the lookup counts of the hostname to the maximum number of lookup counts of hostnames for the same entity. Exemplary step 104 may include extracting hostnames (e.g., cache-miss hostnames, absolute hostname queries, etc.) and respective lookup counts of each hostname from dataset 116. In some embodiments, the collected count records may be deduplicated.

In some embodiments, at least four days of data from passive DNS is processed in determining the first input data 118. In some embodiments, seven consecutive days of data from passive DNS is processed so that the behavior of users (of the entity's hosts) can be represented to include weekend days. In some embodiments, DNS records having resource records types ("rrtypes") equal to "A" or "AAAA" are used in the determination of rankings. For example, a lookup rrtype of "A" is expected to return IPv4 addresses and a lookup rrtype of "AAAA" is expected to return IPv6 addresses. In some embodiments, DNS records having resource record types equal to "NS" are used to reduce the natural overpopulation of hostnames associated to authoritative name servers. For example, the hostnames associated to the answers within "NS" records could be ignored by these methods to produce a more accurate asset ranking.

In some embodiments, host importance ranking 130 may be based on the first input data 118 in step 114.

In submethod 101b, step 106 can include receiving a second dataset 120 including source code for websites associated with the entity. The source code can indicate whether the host of the website is configured to collect data from users of the website. For instance, a website may collect personal data, credentials, responses to security questions, financial information, health-related data, product reviews, business queries, etc. from users (e.g., customers, patients, etc.) of the entity. In another example, the entity may collect data from its own employees or vendors critical to its operation (e.g., in research and development data, manufacturing data, human resources data, legal information, financial data, etc.). For example, the second dataset 120 may be collected manually, or the dataset 120 may be received from a third-party service (e.g., Web crawling data such as Common Crawl of San Francisco, Calif., Censys of Ann Arbor, Mich., or Shodan, or other Internet scanning datasets for devices connected to the Internet). Specifically, data received from Common Crawl may include one or more of the following datasets: (a) Web ARChive (WARC) formatted web crawl data (including, e.g., HTML); (b) WAT data (which include metadata of data stored in the WARC format) stored as serialized JavaScript Object Notation (JSON) objects of Document Object Model (DOM) properties and other metadata; and/or (c) WET data (e.g., plain-text metadata of the data stored in the WARC format). The data received from Internet scanning datasets may include events on devices associated with the entity (e.g., entity-owned devices, devices operated on behalf of the entity, independent devices connected to a network of the entity) connected to the Internet (e.g., via Wi-Fi, Ethernet, etc.).

Exemplary step 108 can include determining, based on the second dataset 120, a second input data 122 indicating, for each host of the web site, whether the source code indicates that the host is configured to collect data from users of the website. Exemplary step 108 can include determining, via the source code of dataset 120, whether the host across any of its web pages supports a POST function by evaluating the source code (e.g., the HTML content, JavaScript, etc.) in host-based events (e.g., from Internet scanning and/or Web crawling). A POST function, for example, enables the collection of user data inputs in a website by the host of the website. In some embodiments, the dataset 120 can be evaluated to detect the function in the websites with a case-insensitive regex tester. In some embodiments, the HTML code of the websites can be parsed to uncover any form node. In some embodiments, forms configured to collect search queries can be excluded (e.g., filtered out) of the dataset 120, as these forms do not typically collect users' personal information (e.g., username, password, responses to questions, etc.).

Exemplary step 108 can include outputting a value (e.g., Boolean, binary, etc.) with each hostname indicating whether that host supports such a function. Exemplary step 108 may include extracting URLs of websites identified as supporting user input of data. In some embodiments, the URLs can be presented with host importance ranking.

In some embodiments, host importance ranking 130 may be based on the second input data 122 in step 114.

In submethod 101c, step 110 can include receiving a third dataset 124 including one or more authentication certificates (e.g., Extended Validation (EV) certificates) associated with one or more of the hosts. For example, EV certificates can enable verification of the legal identity of the entity that owns the EV certificate and in some cases can be used to secure web applications and sign electronic documents.

Exemplary step 112 can include determining, based on the third dataset 124, a third input data 126 that indicates whether a host has an authentication certificate. Exemplary step 112 may include evaluating X.509 certificates associated with host-based events to determine whether the host has an EV certificate. Exemplary step 112 may include determining whether the certificate includes an object identifier (OID) that matches an OID in a list of publicly known OIDs that correspond to an indication that the certificate is an EV certificate. Exemplary step 112 may include determining the hostname associated with the event and mapping the hostname to the appropriate entity. Exemplary step 112 may include outputting a value (e.g., Boolean, binary, etc.) indicating whether the host has an EV certificate. In some embodiments, host-related events and/or IP address-related events can be evaluated to determine whether the events are associated with an EV certificate.

In some embodiments, host importance ranking 130 may be based on the third input data 126 in step 114.

In some embodiments, the host(s) of an entity may be identified and ranked based on one or more of the datasets 118, 122, 126. In other words, information about a host may be available from only one of the datasets or some combination of the datasets. For example, dataset 118 may include information with respect to Host A and Host B; dataset 122 may include information with respect to Host B; and dataset 126 may include information with respect to Host A and Host C. The host importance ranking calculated at step 114 can include a ranking of each of Host A, Host B, and Host C, even though not every dataset may have corresponding information for each of the hosts A, B, and C.

In some embodiments, the first dataset 116, second dataset 120, and third dataset 124 can be received in any order. Similarly, the processed input data 118, 122, 126 can be provided to the algorithm 128 in any order.

In some embodiments, the datasets 116, 120, and/or 124 may include hostnames for multiple entities. In this case, the exemplary method 100a can include filtering the datasets 116, 120, and/or 124 so as to extract hostnames for a particular entity. In some embodiments, the exemplary method 100a can include associating the hostname with an identifier (e.g., a global unique identifier (GUID) of the entity). In some embodiments, the method 100a can include mapping the hostname(s) to the corresponding entity.

Exemplary step 114 can include determining, for each host associated with the entity, a host importance ranking 130 based on a combination and/or weighting of the first input data 118, the second input data 122, and/or the third input data 126. In some embodiments, step 114 can include determining the host importance ranking 130 and can be based on additional and/or alternative input data, as described herein (see, e.g., under headings "IP Address Importance" and "Further Exemplary Embodiments"). In some embodiments, if the lookup count for a corresponding hostname is zero (e.g., no DNS traffic), the corresponding hostname can be ranked lower than if it had one or more lookup counts. In some embodiments, if the host has no lookup counts but supports a POST function or has an EV certificate, the host may be ranked slightly higher.

In some embodiments, if the lookup count is at least one, the host importance ranking 130 can be such that the first weight is set to equal to the second weight and the third weight set to equal to less than the first weight, such that the sum of the first weight, the second weight, and the third weight is equal to one (1). If the lookup count is zero, a sum of the second weight and the third weight can be set to equal or less than the first weight.

In some embodiments, if the lookup count for a corresponding host is greater than zero, the host importance ranking 130 can be based on the following weights:

Weight associated with hosts having non-zero lookup counts=$W_{lookup}$=0.45

Weight associated with hosts supporting POST function=$W_{post}$=0.45

Weight associated with hosts having EV certificates=$W_{ev}$=0.10

In some embodiments, if the lookup count for a corresponding host is zero, the combined total of the weights for the POST function and EV certificates are set to 0.15. Therefore, the host importance ranking 130 can be based on the following weights:

Weight associated with hosts supporting POST function=$W_{post}$=0.10

Weight associated with hosts having EV certificates=$W_{ev}$=0.05

An exemplary weighing algorithm 128 may be:

Host importance ranking 130=maximum of {(data 118),(data 118*$W_{lookup}$+data 122*$W_{post}$+data 126*$W_{ev}$)}

In a particular embodiment, the exemplary weighting algorithm 128 may be:

Host importance ranking 130=maximum of {(lookup ratio),(lookup ratio*$W_{lookup}$+POST value*$W_{post}$+EV value*$W_{ev}$)}

Note that the above exemplary algorithm 128 equals the lookup ratio (of the first input data 118) when it is greater than the combined weighted sum of the input data (e.g., input data 118, 122, and 124). In other words, hosts having greater DNS traffic (as represented in the number of lookup counts) are preferentially treated in the algorithm and can be ranked higher than hosts with less (or zero) DNS traffic.

In some embodiments, each host associated with an entity can be assigned a unique identifier. The identified hosts can be those that are received via the datasets 116, 120, and/or 124. A unique identifier for each host can enable the ranking of host importance to be more efficiently updated (e.g., as additional or alternative datasets are received). The unique identifier can enable the ranking of hosts to be used in other systems and methods. For example, the host identifiers can be used in methods and systems determining the security of the hosts of a particular entity. In some embodiments, the unique identifier for the hosts can be determined as the host importance is being ranked (e.g., at step 112). An exemplary unique identifier has a length such that the identifiers avoid collisions due to a birthday attack. For example, the unique identifiers can be 256 bit (32 byte) identifiers (e.g., using SHA-256 hash function).

In some embodiments, the datasets 116, 120, and/or 124 may be drawn from one or more overlapping sources. For example, the second dataset 120 and third dataset 124 may originate from a single source, e.g., Internet scanning. In some embodiments, the datasets 116, 120, and/or may be drawn from multiple sources. For example, some or all of the second dataset 120 may be source from two or more sources, e.g., Internet scanning and Web crawling, as discussed above.

IP Address Importance

Figure 2A:
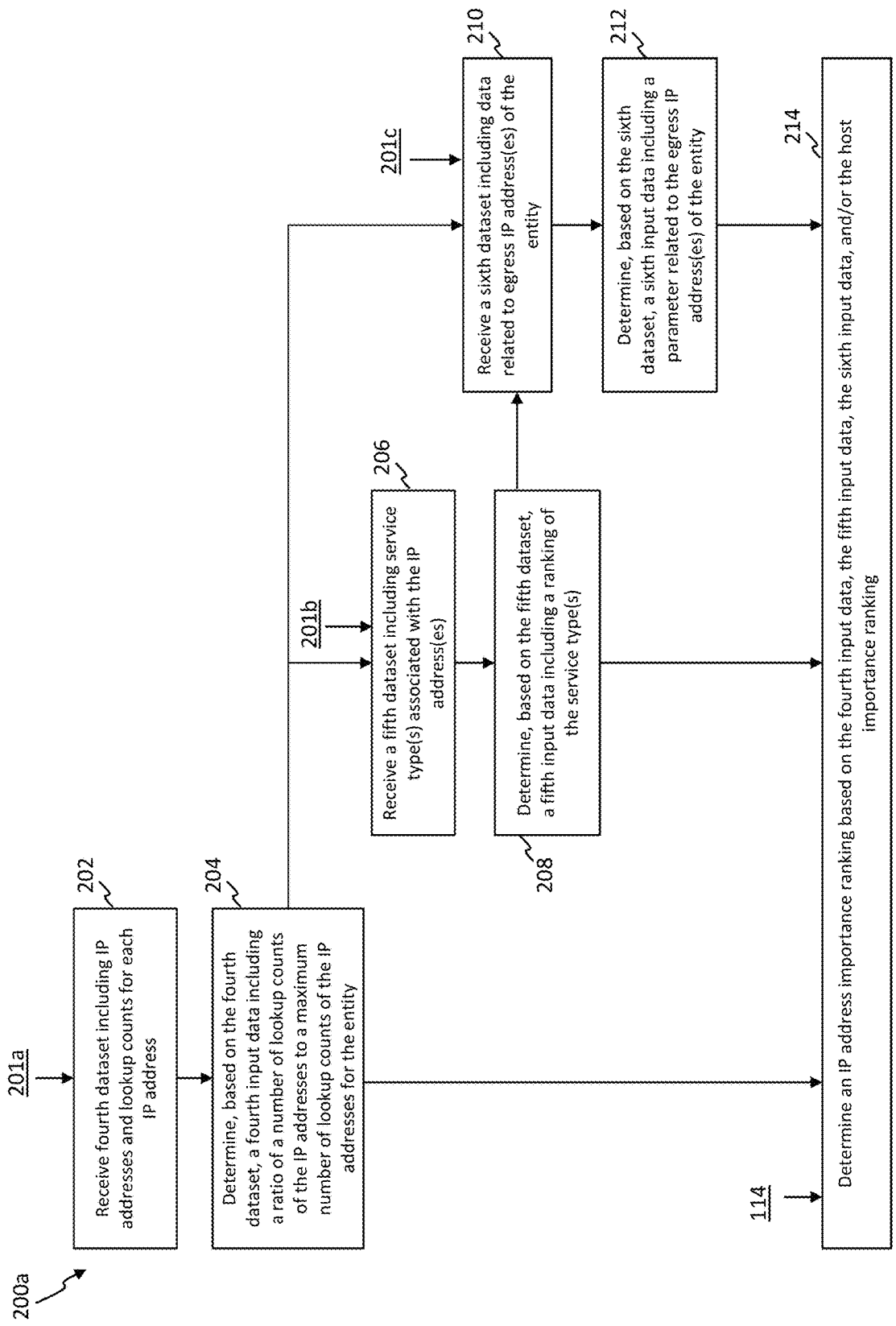
FIG. 2A is a flowchart of an exemplary method for determining IP address importance to an entity.
Figure 2B:
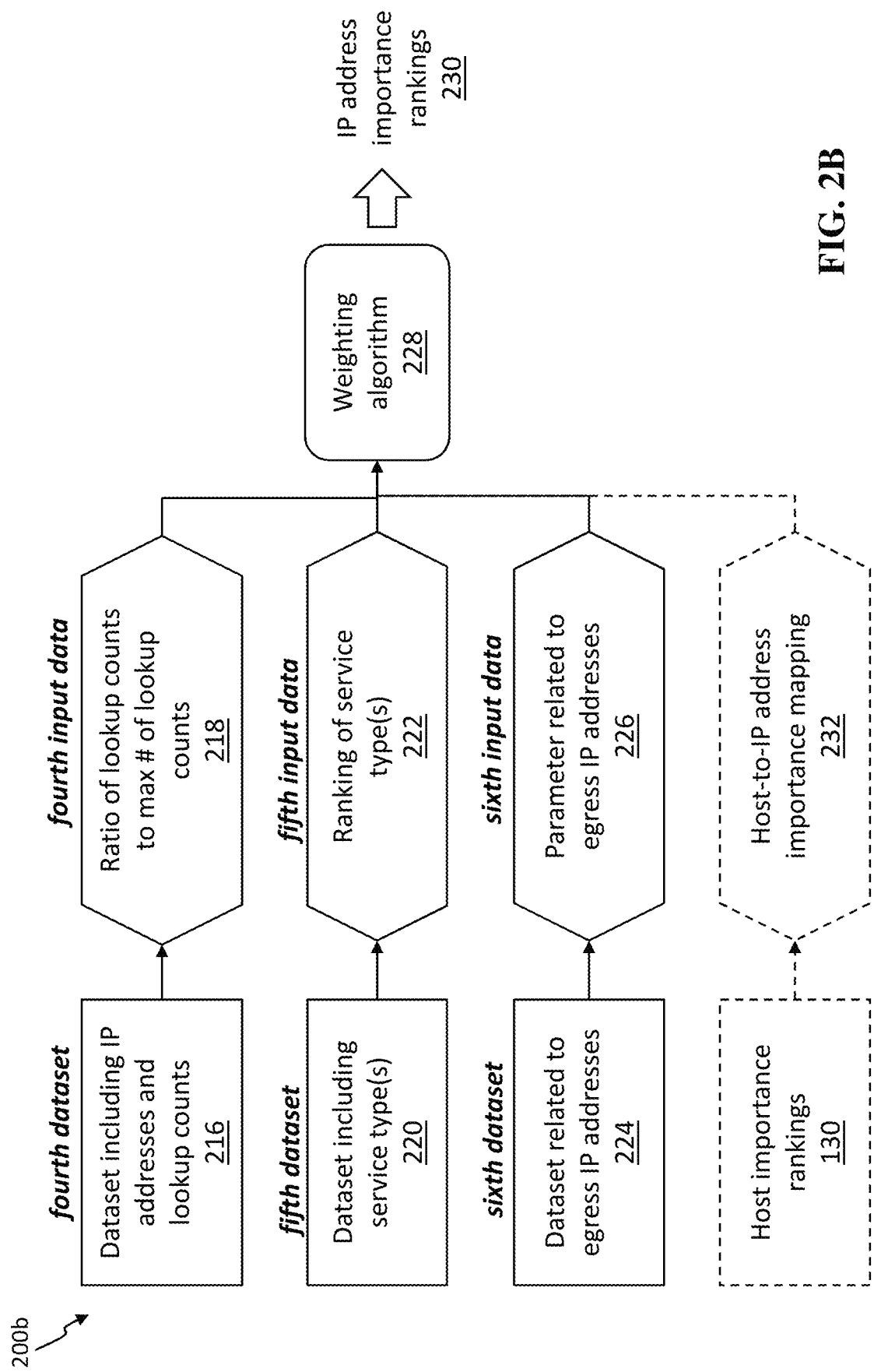
FIG. 2B is a diagram illustrating the data processing workflow according to the exemplary method of FIG. 2A.

FIG. 2A is a flowchart of an exemplary method 200a for determining IP address importance to an entity. FIG. 2B is a diagram illustrating the data processing workflow 200b according to the exemplary method 200a. Exemplary method 200a may include one or more submethods 201a, 201b, 201c. For example, the method 200a may include submethods 201b and 201c or, in another example, method 201a may include submethod 201a.

Exemplary step 202 of submethod 201a can include receiving fourth dataset 216 including IP addresses of the entity and lookup counts for each IP address. For example, the fourth dataset 216 can be collected manually or received from a third-party service (e.g., passive DNS dataset from a service provider(s)). In some embodiments, the first dataset 116 can be received with the fourth dataset 216 such that the combined dataset can provide insight into the lookup counts for hosts and corresponding IP addresses (or vice versa). In other words, the combined dataset can be sorted by host or IP address for a given entity. One benefit is that the processing of the combined dataset (including the first dataset 116 and the fourth dataset 216) can be more efficient than the separate processing of each dataset 116, 216 individually.

Exemplary step 204 can include determining, based on the fourth dataset 216, a fourth input data 218 including a ratio of a number of lookup counts of the IP addresses to a maximum number of lookup counts of the IP addresses for the entity. Exemplary step 204 may include extracting IP addresses and respective lookup counts from dataset 216. In some embodiments, the collected count records may be deduplicated.

In some embodiments, at least four days of data from passive DNS is processed in determining the fourth input data 218. In some embodiments, seven consecutive days of data from passive DNS is processed so that the behavior of users (of the entity's hosts) can be represented to include weekend days.

In some embodiments, IP address importance ranking 230 may be based on the fourth input data 218 in step 214.

Exemplary step 206 of submethod 201b can include receiving a fifth dataset 220 including one or more service types associated with one or more IP addresses associated with the entity. The step 206 may include extracting the IP address(es) and a type or description of the service module(s) and/or determining the application(s) operating on the service from the dataset 220. This data may be collected manually and/or received from a third-party service (e.g., Shodan, Censys, etc.). In some embodiments, at least thirty (30) days of data is collected for the service type(s) associated with the IP address.

The importance of an IP address can be influenced by the type of service or application running on the particular IP address. By collecting the service or application types and categorizing the service or application types, the importance of the IP address may be more finely tuned in the ranking of IP addresses. In some embodiments, the service or application is considered based at least in part on its function and/or criticality to the particular entity, while excluding the service or application's security configuration. A service or application may be ranked in this manner so that a prior decision by the entity to secure (or not to secure) the service or application does not influence the determination of importance based on an objective standard. For example, an IP address for a system hosting a database without use of authentication for access will be ranked as important as an IP address for a system hosting a database with the use of authentication. This can be important for assets that an entity did not originally deem as important but may be revealed to be critically or highly important via the ranking methods described herein.

Exemplary step 208 can include determining, based on the fifth dataset 220, a fifth input data 222 including a ranking of services and/or applications. In some embodiments, the ranking may be determined by comparing each service or application to a database of pre-ranked services. In some embodiments, service and application groups can be predetermined and listed in a database. These groups may be ranked based on general importance to entities. For example, databases are typically important to all entities due to the effort required to build and maintain them, the confidentiality of the data, etc. In some cases, the service and applications may be ranked based on its importance to types of entities (e.g., a gaming company as compared to a healthcare company) and/or to the specific entity. Below in Table 1 is a non-exclusive and non-limiting list of services and applications that are pre-grouped and pre-ranked.

TABLE 1

Exemplary list of services by group and ranking.

| Service or Application Group | Service or Application | Rankings Value | Minimum Ranking |
|---|---|---|---|
| Databases | mysql<br>postgresql<br>redis<br>mongodb<br>memcache<br>memcache-udp<br>zookeeper<br>cassandra<br>couchdb | 0.7 | CRITICAL |
| Authentication Protocols | ldap-tcp<br>ldap-udp<br>ldaps<br>Kerberos | 0.6 | CRITICAL |
| Communication Services | smtp<br>smtps<br>pop3<br>pop3-ssl<br>imap<br>imap-ssl<br>xmpp<br>sip<br>rtsp-tcp<br>dahua-dvr<br>amqp | 0.6 | CRITICAL |

TABLE 1-continued

Exemplary list of services by group and ranking.

| Service or Application Group | Service or Application | Rankings Value | Minimum Ranking |
|---|---|---|---|
| Network Remote Access | ike<br>ike-nat-t<br>pptp | 0.5 | CRITICAL |
| Industrial Control Systems | bacnet<br>secure-fox | 0.4 | CRITICAL |
| System Remote Access | ssh<br>telnet<br>rdp<br>vnc<br>ipmi<br>x11<br>cisco-smi<br>smb<br>telnets<br>java-rmi | 0.3 | HIGH |
| Network Infrastructure | bgp<br>rip<br>snmp<br>dns-tcp<br>dns-udp<br>dhcp | 0.1 | HIGH |
| File Exchange | ftp | 0.05 | HIGH |
| Web Content | http<br>https | 0.0 | LOW |

In some embodiments, an IP address can be associated with two or more services or applications. In such a case, the ranking of the highest ranked service or application is retained for the IP address. For example, if the IP address is associated with both a database (critical ranking) and system remote access (high ranking), the highest ranking is "critical." Therefore, the critical ranking of the services or applications is retained in the fifth input data 222. In some embodiments, if a service or application type is not found in the database of pre-ranked service or application types (see, e.g., Table 1), a default ranking may be provided (e.g., medium or low).

In some embodiments, IP address importance ranking 230 may be based on the fifth input data 218 in step 214.

Exemplary step 210 of submethod 201c can include receiving a sixth dataset 224 including data related to egress IP addresses associated with the entity. Egress IP addresses are typically used by workstations, endpoint machines, mobile devices, user devices, etc. and can be particularly vulnerable to security risks (e.g., infections, spear phishing attacks, etc.). Data related to egress IP address may be collected manually and/or drawn from third-party sources (e.g., operators of individual websites, providers of web-based libraries, content delivery network (CDN) content providers, advertisement and marketing technology firms, etc.).

In some embodiments, sixth dataset 224 can include fingerprints and/or cookies associated with IP address(es) associated with the entity. In some embodiments, the fingerprint and/or cookie-based data enables an estimation of the number of unique devices associated with a particular IP address. In some embodiments, the estimation of the number of unique devices associated with a particular IP address may be derived from a model constructed from other characteristics (e.g., distinct URLs visited, distinct websites visited, etc.). For example, if an entity has multiple egress IP addresses, the dataset 224 is used in the method 200a to appropriately rank IP addresses that have greater utilization over IP addresses with less utilization. In some embodiments, at least sixty (60) days (e.g., at least sixty continuous days) of fingerprint-related and/or cookie-related data is collected for the IP address(es) of the entity. In some embodiments, if there is less than sixty days of data for a given IP address, the associated data may be used differently (e.g., not included in determining ranking) or given less weight (e.g., in determining ranking).

In some embodiments, sixth dataset 224 can additionally or alternatively include an infection status of system(s) associated with the IP address(es). Measures of the infection status of systems can include the number of unique malware families identified on the entity's systems. In some embodiments, at least ninety (90) days (e.g., at least ninety continuous days) of infection status data is collected for the IP address(es) of the entity.

Exemplary step 212 can include determining, based on the sixth dataset 224, a sixth input data 226 related to the egress IP address(es) of the entity. The sixth input data 226 may include a ratio of a number of unique fingerprints and/or unique cookies of a particular IP address of the entity to the maximum of the numbers of unique fingerprints and/or unique cookies for total identified IP addresses of the entity. The sixth input data 226 may include a ratio of the number of unique malware families associated with a particular IP address to a maximum of the number of unique malware families associated with the total identified IP addresses of the entity. For example, the "total identified IP addresses" of a given entity may be the IP addresses received in a given batch of data of the sixth dataset 224.

In some embodiments, IP address importance ranking 230 may be based on the sixth input data 218 in step 214.

Exemplary step 214 can include determining, for each IP address of the entity, an IP address importance ranking 230 based on the fourth, fifth, sixth, and/or the host-to-IP address importance mapping 232. In some embodiments, the ranking 230 can be determined via a weighting algorithm 228. The algorithm 228 can be based on a maximum value based on: (i) the fourth input data 218, (ii) the fifth input data 222, (iii) the sixth input data 226, and/or (iv) the host-to-IP address importance mapping 232. For example, the algorithm 228 can be:

$$\text{maximum } \{(\text{maximum}(\text{data } 218, \text{rankings } 130)*(1-(\text{data } 222)^2)+(\text{data } 222)^2),(\text{data } 218),(\text{data } 226),(\text{rankings } 130)\}$$

The above exemplary weighting algorithm 228 can account for data from a variety of existing and future sources. In some embodiments, step 214 can include determining the IP address importance ranking 230 and can be based on additional and/or alternative input data, as described herein (see, e.g., under headings "Host Importance" and "Further Exemplary Embodiments"). By using the maximum function, some data are emphasized over others in ranking the IP addresses of the entity. For example, if traffic observed (e.g., in data 216) to the IP address is significant over other values, that the value of data 218 may be used. If the service ranking of a particular IP address (e.g., in data 220) augmented by the traffic data (e.g., in data 216) or related host importance (e.g., in rankings 130) is significant over other values, then service-based data 222 may be emphasized. If there is any traffic observed via cookie-based or fingerprint endpoint telemetry and is high enough (e.g., in data 224), then data 226 may be used. However, if no cookie-based or fingerprint-based telemetry was observed, then infections can be used to understand whether infections on that IP address occurred, and that value may be returned (e.g., in data 226). If the rankings value of any of the IP addresses' associated hosts is high enough, that data from rankings 130 may be used.

As discussed above, the host-to-IP address importance mapping 232 may be used as part of the weighting algorithm 228. For example, the method 200a can include determining the ranking of a host associated with the IP address based on the host importance ranking 130. In some embodiments, for a given entity, the host importance ranking 130 is received for each host associated with the IP address. In some embodiments, multiple hosts may be associated with an IP address. In other embodiments, one host may be associated with multiple IP addresses. In some embodiments, the IP address importance ranking 230 for a particular IP address is compared to the host importance ranking 130. In some cases, the particular IP address is given the same or greater ranking of the associated host(s).

Host and IP Address Importance

Figure 3:
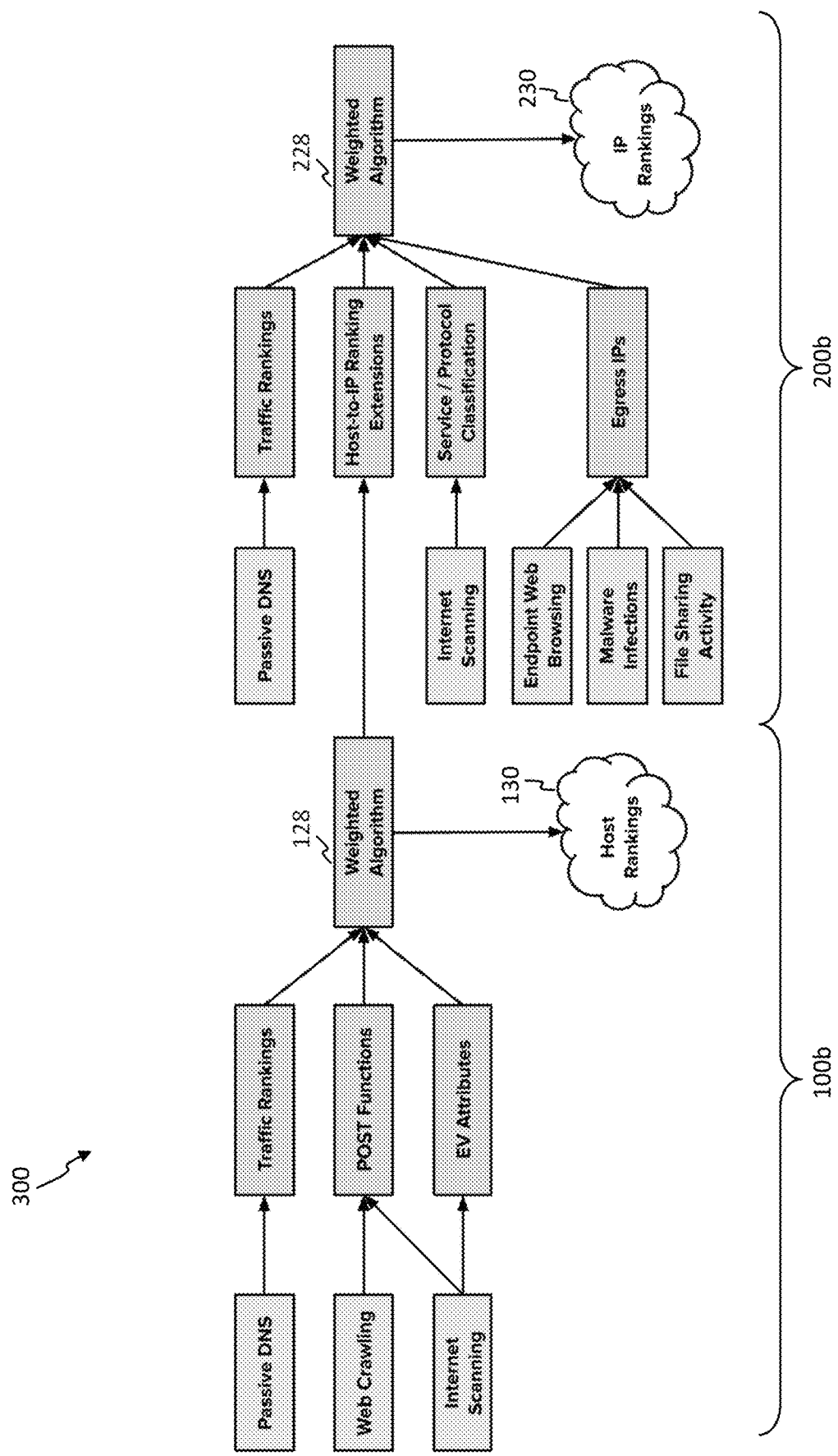
FIG. 3 is a diagram of an exemplary data processing workflow according to an exemplary method for determining host and IP address importance.

FIG. 3 is a diagram of an exemplary data processing workflow 300 according to an exemplary method for ranking host and IP address importance. Workflow 300 can include exemplary workflows 100b and 200b. As indicated, element numbers used in FIG. 3 are intended to provide examples of elements used in workflows 100b and 200b and are not intended to be limiting. For example, workflow 100b can be connected to workflow 200b such that the output of the weighting algorithm 128 are directly or indirectly provided to weighting algorithm 228, as described above.

Ranking Presentation

In various embodiments, the ranking of assets (e.g., hosts, IP addresses, etc.) can be numerical, by group, and/or qualitative. In some embodiments, the numerical outputs of the ranking algorithms (see, e.g., weighting algorithms 128, 228) can be grouped or "bucketed" into qualitative groups that may be more easily interpreted by an end user of the asset importance ranking systems and methods. For example, in a three-bucket organization, the rankings can be according to Table 2:

TABLE 2

Rankings in a three-bucket organization.

| Bucket | Importance | Numerical Ranking |
|---|---|---|
| 1 | High | output ≥ 0.1 |
| 2 | Medium | 0.1 > output ≥ 0.01 |
| 3 | Low | 0.01 > output |

In another example, in a four-bucket organization, the rankings can be according to Table 3:

TABLE 3

Rankings in a four-bucket organization.

| Bucket | Bucket | Numerical Ranking |
|---|---|---|
| 1 | Critical | output ≥ 0.1 |
| 2 | High | 0.1 > output ≥ 0.01 |
| 3 | Medium | 0.01 > output ≥ 0.001 |
| 4 | Low | 0.001 > output |

In some embodiments, a user may be prevented from modifying the groupings of importance rankings to ensure integrity of the ranking results. For example, the methods may be applied to the assets of entities uniformly within an industry or peer group (e.g., based on size, revenue, specialization, etc.). This may be important to entities to see how it compares to its competitors and important to third parties that evaluate groups of entities (e.g., in an insurance or funding portfolio).

In other embodiments, a user can create or customize groupings of importance rankings based on, e.g., the entity's perception of the importance of assets or a third-party's business practices.

In some embodiments, the rankings may be based on the output of the algorithms 128, 228. For example, the rankings may correspond to percentages of the output and/or organized by percentiles (e.g., quartiles, deciles, etc.). For example, in a quartile-based ranking, the top quartile can correspond to "Critical", the second quartile to "High", the third quartile to "Medium", and the bottom quartile to "Low".

In some embodiments, the asset importance ranking may be presented to a user associated with the entity (e.g., a stakeholder) in a user interface (e.g., coupled to a system configured to execute processes of methods 100a, 200a, etc.). The asset rankings may be presented separately (e.g., host importance ranking 130 separate from IP address ranking 230) or together. In some embodiments, for combined asset importance ranking, the method may include determining the relationship between one or more hosts and one or more IP addresses such that: (i) a related pair of host and IP address have the same or similar ranking, and/or (ii) the host and/or IP address are presented in visual proximity to each other for ease of review by a user. In some embodiments, if one asset was identified and ranked via the methods described herein (e.g., a particular IP address) and the corresponding host has not been identified, the presentation may include an indication that the corresponding host has not been identified and/or ranked. In some embodiments, the user may be able to select particular asset(s) of interest to review its importance ranking.

In some embodiments, the systems and methods can include determining an explanation of the asset ranking. For example, for a given asset (e.g., host or IP address), an explanation can be provided by determining the term or terms given more weight in the weighting algorithms 128, 228. For example, in a host asset, the lookup counts of input data 118 may be weighted more than other terms in the weighting algorithm if the data 116 reflected significant traffic. Therefore, an exemplary explanation for the corresponding host importance ranking may include:

This asset was included as High importance because it was observed in the top 10th percentile of most frequently accessed systems.

Other non-limiting examples of explanations may include:

This asset was included as High importance because it was observed to support user-submitted data and was observed as a system being accessed by users.

This asset was included as Medium importance because it was observed hosting an EV certificate.

This asset was included as Low importance because it was observed being infrequently accessed by its users.

In some embodiments, the methods can include presenting the explanation or supporting details with the asset importance ranking. For example, as discussed above, for a host ranked based on its associated website including a POST function, the URL of the website may be presented with the particular host for review by the user.

In some embodiments, the asset importance ranking(s) may depend on the relationships between entities. For example, in a parent-subsidiary corporate relationship, a subsidiary entity may have a set of assets that make up only a small fraction of assets of the parent entity. Therefore, an asset ranked "High" for the subsidiary may only be ranked "Low" for the parent. In some embodiments, an explanation regarding ranking discrepancies between related entities may also be determined and/or presented.

In some embodiments, the asset importance ranking(s) may be determined at different times (e.g., periodically, intermittently, upon request, etc.). In some cases, the ranking(s) may change with time. In some embodiments, the ranking(s) may be presented with timestamps. In some embodiments, the methods can include ranking the asset with the same importance over time, even if the importance has changed over time. For example, if a host has been attributed a "High" importance ranking, then that ranking may persist for some time (e.g., on the order of months or years, or determined amount of time depending on the entity) even if the host is later assigned a "Medium" importance ranking.

In some embodiments, if volatility in asset importance ranking is observed for one or more of entities, the method may access one or more previous runs' rankings. The method may include applying a decay function to the ranking for each asset from the previous run and using the result as an input into the weighted algorithms 128, 228. For example, such a process can ensure that an asset slowly decays away from a "Critical" or "High" importance ranking, instead of bouncing between a "Low" and "High" importance ranking. Volatility in an asset importance ranking may occur if an entity's assets are being ranked for the first time. In another example, volatility may occur if the entity gains a new asset (e.g., a new host or IP address) or stops using an asset.

Additional Exemplary Embodiments

In some embodiments, additional or alternative datasets or processes can be included in determining the asset importance ranking(s). These datasets and/or may enrich the diversity of assets in the importance ranking and/or increase the accuracy of the ranking buckets. Increasing the diversity of input types can also lead the rankings to become more stable, as fluctuations in one input will not dramatically change the resulting rankings if the diversity of inputs is large.

In some embodiments, methods may include receiving asset importance data from users associated with entities. For example, users may provide their own rankings or assign their asset(s) with what they perceive is the importance ranks within their organization.

In some embodiments, methods may include receiving Netflow data which includes IP traffic information. Netflow data may provide a view into the usage of individual IP addresses. For example, Netflow data can include volume information for both outbound and inbound connections, and may include a description of volume of data exchanged between two endpoints.

In some embodiments, methods may include receiving asset identification data from systems configured to identify assets of entities. The asset identification data may also enable providing more comprehensive explanations of the context of a given asset. Contexts may include domain control, mobile device management (MDM) solutions, single sign-on (SSO) solution, file exchange, etc. Examples of methods and systems for identifying assets of entities can be found in U.S. Publication No. 2018/0375822 A1 published on Dec. 27, 2018 and titled "Methods for mapping IP addresses and domains to organizations using user activity data", U.S. Pat. No. 9,830,569 issued Nov. 28, 2017 and titled "Security assessment using service provider digital asset information", and U.S. Publication No. 2017/0236077 A1 published on Aug. 17, 2017 and titled "Relationships among technology assets and services and the entities responsible for them", which are incorporated by reference herein in their entireties.

In some embodiments, the methods can include extracting predefined web applications that are configured in single sign-on (SSO) solutions in determining asset importance. For example, there exist some SSO solutions that make the web application selection available on the same screen as the login credentials, which may leak information about an entity's web applications.

In some embodiments, the methods can include assessing interconnected assets (e.g., web applications). For example, the method may include building a graph of an entity's web applications via interconnected links. This information may enable similar or more rational rankings of interconnected assets.

In some embodiments, the methods can include extracting administratively-defined information from DNS records that describe important information about the context of the domain configuration, e.g., the entity's email systems, any verification steps the entity's administrator has taken to confirm the domain with third-party services, etc.

In some embodiments, the methods can include identifying one or more websites that are using various Search Engine Optimization (SEO) strategies to increase the prevalence and visibility of their web applications. Such websites are systems that entity stakeholders want their users and customers to visit if they are applying specific design choices for the purposes of increasing its visibility in search results. Such assets may have corresponding higher importance rankings by virtue of these identifications.

In some embodiments, the methods can include identifying publicly accessible API(s) or other backend component(s) that service a critical function between systems or services of the entity. This can include attributes about HTTP responses from systems that demonstrate characteristics of whether the system is an HTTP-based API.

In some embodiments, the methods can include analyzing the domain popularity (e.g., traffic) within certificates to weigh the importance of a root domain name. This method may enable the inference of a slightly higher level of base importance for related hostnames of a root domain name when an entity primarily uses one particular domain.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 4:
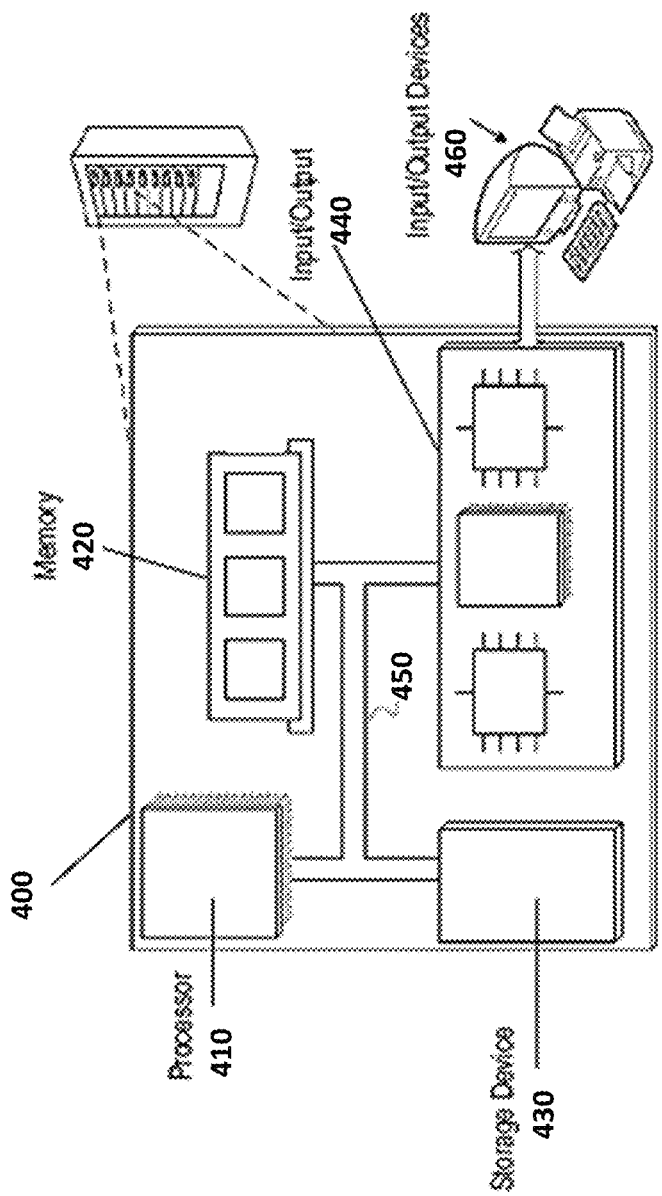
FIG. 4 is a block diagram of an example computer system that may be used in implementing the systems and methods described herein.

FIG. 4 is a block diagram of an example computer system 400 that may be used in implementing the technology described in this document. General-purpose computers, network appliances, mobile devices, or other electronic systems may also include at least portions of the system 400. The system 400 includes a processor 410, a memory 420, a storage device 430, and an input/output device 440. Each of the components 410, 420, 430, and 440 may be interconnected, for example, using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430.

The memory 420 stores information within the system 400. In some implementations, the memory 420 is a non-transitory computer-readable medium. In some implementations, the memory 420 is a volatile memory unit. In some implementations, the memory 420 is a nonvolatile memory unit.

The storage device 430 is capable of providing mass storage for the system 400. In some implementations, the storage device 430 is a non-transitory computer-readable medium. In various different implementations, the storage device 430 may include, for example, a hard disk device, an optical disk device, a solid-date drive, a flash drive, or some other large capacity storage device. For example, the storage device may store long-term data (e.g., database data, file system data, etc.). The input/output device 440 provides input/output operations for the system 400. In some implementations, the input/output device 440 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 460. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 430 may be implemented in a distributed way over a network, such as a server farm or a set of widely distributed servers, or may be implemented in a single computing device.

Although an example processing system has been described in FIG. 4, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method for ranking importance of assets of an entity, the assets comprising hosts associated with the entity, the method comprising:
    receiving at least one of:
        a first dataset comprising (i) a respective plurality of hostnames of a plurality of hosts and (ii) lookup counts for each hostname of the plurality of hostnames, the lookup counts obtained from a stream of a domain name system (DNS) queries;
        a second dataset comprising source code for a plurality of websites indicating, for each website, whether a host of the website is configured to collect data from users, the websites associated with the entity; or
        a third dataset comprising a plurality of authentication certificates associated with at least one of the plurality of hosts;
    determining input data based on the received at least one first dataset, second dataset, or third dataset such that:
        when the first dataset is received, determining a first input data comprising, for each host of the plurality of hosts, a ratio of (a) a number of lookup counts of the hostname of the host to (b) a maximum number of lookup counts of the plurality of hostnames for the entity;
        when the second dataset is received, determining a second input data indicating, for each host of the website, whether the source code indicates that the host is configured to collect data from users of the website; and
        when the third dataset is received, determining a third input data indicating, for the at least one host, whether the host has an authentication certificate; and
    determining, for each host associated with the entity, a host importance ranking based on the determined input data.

2. The method of claim 1, further comprising:
    receiving at least two of the first dataset, second dataset, or third dataset; and
    determining, for each host associated with the entity, the host importance ranking based on a weighting of the at least two of the first input data, the second input data, or the third input data.

3. The method of claim 2, further comprising receiving the first dataset,
    wherein determining, for each host associated with the entity, the host importance ranking further comprises:
        if the lookup count is zero, determining that the host importance ranking is lower than a host associated with (i) one or more lookup counts, (ii) source code indicating that the host is configured to collect data from users of the web site, or (iii) an authentication certificate.

4. The method of claim 2, further comprising:
    receiving the first dataset, second dataset, and third dataset;
    determining, for each host associated with the entity, the host importance ranking based on the weighting of the first input data, the second input data, and the third input data; and
    determining a maximum of:
        (i) the first input data; and
        (ii) a sum of:
            (a) the first input data multiplied by a first weight;
            (b) the second input data multiplied by a second weight; and
            (c) the third input data multiplied by a third weight.

5. The method of claim 4, further comprising:
    if the lookup count is at least one, setting the first weight to equal to the second weight and the third weight to equal to less than the first weight, such that the sum of the first weight, the second weight, and the third weight is equal to one; and
    if the lookup count is zero, setting a sum of the second weight and the third weight to equal less than the first weight.

6. The method of claim 1, further comprising:
    assigning a unique identifier to each host associated with the entity.

7. The method of claim 1, wherein the first dataset comprises lookup counts for each hostname over seven consecutive days.

8. The method of claim 1, wherein the source code comprises HTML data for the plurality of websites.

9. The method of claim 1, wherein, when the second dataset is received, determining the second input data further comprises:

determining whether the source code indicates that the website includes a form for collecting data from the users of the website.

10. The method of claim 9, wherein, when the second dataset is received, determining the second input data further comprises:
excluding those websites in which the form collects only search queries.

11. The method of claim 1, further comprising:
presenting the host importance ranking in a user interface.

12. The method of claim 11, wherein, when the second dataset is received, determining the second input data further comprises:
collecting a URL of the website,
wherein presenting the host importance ranking in a user interface comprises:
presenting the URL of the website with the corresponding host.

13. The method of claim 1, wherein the assets further comprise Internet Protocol (IP) addresses associated with the entity, the method further comprising:
receiving at least one of:
a fourth dataset comprising (i) a plurality of IP addresses and (ii) lookup counts for each IP address of the plurality of IP addresses;
a fifth dataset comprising at least one service or application type associated with at least one IP address associated with the entity;
a sixth dataset comprising fingerprints and/or cookies associated with another plurality of IP addresses associated with the entity;
determining additional input data based on the received at least one fourth dataset, fifth dataset, or sixth dataset such that:
when the fourth dataset is received, determining a fourth input data comprising a ratio of (a) a number of lookup counts of the IP addresses to (b) a maximum number of lookup counts of the IP addresses for the entity;
when the fifth dataset is received, determining a fifth input data comprising a ranking of the at least one service or application type, the ranking determined by comparing each service or application type to a database of pre-ranked service or application types;
when the sixth dataset is received, determining a sixth input data comprising a ratio of (a) a number of unique fingerprints and/or unique cookies of an IP address of the other plurality of IP addresses to (b) a maximum of numbers of unique fingerprints and/or unique cookies for the other plurality of IP addresses of the entity; and
determining, for each IP address associated with the entity, an IP address importance ranking based on the determined additional input data.

14. The method of claim 13, further comprising:
determining, for each IP address of the entity, the IP address importance ranking based on a weighting of the at least two of the fourth input data, the fifth input data, the sixth input data, or the host importance ranking.

15. The method of claim 13, wherein the fifth dataset comprises at least two service or application types for a particular IP address of the at least one IP address, and
wherein, when the fifth dataset is received, determining the fifth input data comprises:
determining the ranking of the at least two or application service types; and
retaining a ranking of a highest ranked service or application type of the at least two service or application types.

16. The method of claim 13, wherein the fifth dataset comprises at least thirty days of data related to the at least one service or application type.

17. The method of claim 13, wherein, when the fifth dataset is received, determining the fifth input data comprises:
ranking the at least one service or application type based on a function and/or a criticality of a corresponding service or application having the at least one service or application type.

18. The method of claim 13, wherein the sixth dataset further comprises infection status of systems associated with the other plurality of IP addresses.

19. The method of claim 18, wherein the infection status of systems includes a measure of malware families identified to be associated with the other plurality of IP addresses.

20. The method of claim 19, wherein the sixth input data further comprises a ratio of (i) a number of unique malware families associated with a particular IP address of the other plurality of IP addresses to (ii) a maximum of numbers of unique malware families associated with the other plurality of IP addresses.

21. The method of claim 13, wherein the sixth dataset comprises at least sixty days of data related to fingerprints and/or cookies associated with the other plurality of IP addresses.

22. The method of claim 13, further comprising receiving the fourth dataset, the fifth dataset, and the sixth dataset, wherein determining, for each IP address of the entity, the IP address importance ranking is based on a maximum value from the group consisting of: the fourth input data, the fifth input data, the sixth input data, and the host importance ranking.

23. The method of claim 22, further comprising:
for at least one IP address, setting the IP address importance ranking to equal to or greater than the host importance ranking of a host associated with the at least one IP address.

* * * * *